United States Patent
Lutsyshyn

(10) Patent No.: US 12,361,265 B2
(45) Date of Patent: *Jul. 15, 2025

(54) SYSTEMS AND METHODS FOR PRE-PROCESSING FOR A MULTI-MODEL MESSAGE GENERATION ARCHITECTURE

(71) Applicant: Internet Investments Group Limited, Central (HK)

(72) Inventor: Roman Lutsyshyn, Ternopil (UA)

(73) Assignee: Internet Investments Group Limited, Central (HK)

( * ) Notice: Subject to any disclaimer, the term of this patent is extended or adjusted under 35 U.S.C. 154(b) by 0 days.

This patent is subject to a terminal disclaimer.

(21) Appl. No.: 18/810,148

(22) Filed: Aug. 20, 2024

(65) Prior Publication Data

US 2024/0412053 A1 Dec. 12, 2024

Related U.S. Application Data

(63) Continuation of application No. 18/204,814, filed on Jun. 1, 2023.
(Continued)

(51) Int. Cl.
*G06F 40/284* (2020.01)
*G06N 3/0499* (2023.01)
(Continued)

(52) U.S. Cl.
CPC ......... *G06N 3/0499* (2023.01); *G06F 40/284* (2020.01); *H04L 51/02* (2013.01); *H04L 51/216* (2022.05)

(58) Field of Classification Search
CPC ...... G06F 40/30; G06F 3/04842; G06F 40/56; G06F 16/3329; G06F 40/274;
(Continued)

(56) References Cited

U.S. PATENT DOCUMENTS 11,425,064 B2 8/2022 Ball et al.
11,516,158 B1 * 11/2022 Luzhnica ............... G06F 40/35
(Continued)

OTHER PUBLICATIONS

Notice of Allowance issued in corresponding U.S. Appl. No. 18/204,797 dated Aug. 9, 2023.
(Continued)

*Primary Examiner* — Abdelali Serrou
(74) *Attorney, Agent, or Firm* — Foley & Lardner LLP

(57) ABSTRACT

In some aspects, the disclosure is directed to methods and systems for pre-processing for a multi-model message response generation system. A computing device may identify a first plurality of messages; for a first message of the first plurality of messages, determine that the first message is a message of a thread consisting of a single message; responsive to determining that the message is a message of a thread consisting of a single message, i) generate an embedding based on text included in the first message, and ii) store the embedding in a cache file; determine that the second message is a message of a thread comprising multiple messages; and responsive to determining that the second message is a message of a thread comprising multiple messages, train a response generation model using a second plurality of messages included in the thread of the second message.

20 Claims, 10 Drawing Sheets

Related U.S. Application Data

(60) Provisional application No. 63/348,138, filed on Jun. 2, 2022.

(51) Int. Cl.
*H04L 51/02* (2022.01)
*H04L 51/216* (2022.01)

(58) Field of Classification Search
CPC .... G06F 40/284; G06F 40/35; G06F 3/04817; G06F 16/338; G06F 40/216; G06F 40/279; G06F 40/42; G06F 40/44; G06F 40/166; G06F 40/20; G06F 16/245; G06F 16/285; G06F 16/35; G06F 16/353; G06F 21/60; G06F 3/0481; G06F 3/0488; G06F 40/205; G06F 40/40; G06F 16/24578; G06F 16/3347; G06F 16/345; G06F 16/90324; G06F 3/0484; G06F 40/103; G06F 40/58

See application file for complete search history.

(56) References Cited

U.S. PATENT DOCUMENTS

| | | | |
|---|---|---|---|
| 2019/0124019 A1* | 4/2019 | Leon | G06F 3/04842 |
| 2020/0380408 A1* | 12/2020 | Sridhar | G06F 21/60 |
| 2021/0051121 A1 | 2/2021 | Menon et al. | |
| 2021/0110266 A1 | 4/2021 | Wang et al. | |
| 2021/0174221 A1* | 6/2021 | Vijapur Gopinath Rao | G06F 40/30 |
| 2021/0234813 A1 | 7/2021 | Narayan et al. | |
| 2022/0224659 A1* | 7/2022 | El Ghazzal | G06N 20/00 |
| 2023/0267278 A1* | 8/2023 | Pandey | G06F 40/35 704/9 |

OTHER PUBLICATIONS

Non-Final Office Action issued in related U.S. Appl. No. 18/204,814 dated Apr. 3, 2025.

\* cited by examiner

SYSTEMS AND METHODS FOR PRE-PROCESSING FOR A MULTI-MODEL MESSAGE GENERATION ARCHITECTURE

CROSS-REFERENCE TO RELATED APPLICATIONS

This application claims the benefit of priority as a continuation to U.S. patent application Ser. No. 18/204,814, filed Jun. 1, 2023, which claims the benefit of priority to U.S. Provisional Application No. 63/348,138, filed Jun. 2, 2022, the entirety of each of which is incorporated by reference herein.

FIELD OF THE DISCLOSURE

This disclosure generally relates to systems and methods for a multi-model machine learning message generation architecture. In particular, this disclosure relates to systems and methods for using a series of machine learning models to accurately generate responses to message queries based on the type of content in the queries and previous messages, if any, that were a part of a common thread to the query.

BACKGROUND OF THE DISCLOSURE

In recent years, there has been an evolution in communication between users over the Internet. Users were initially able to send emails to each other via email applications, then instant messaging became more popular. Companies began assigning technicians to communicate with the users using such communication protocols to help users with any problems they may be having with applications on their computers. However, as companies have started communicating with such users at scale, companies have increasingly uploaded chatbot, chatterbot, email bot, and/or autoresponder software applications to their system to automatically handle conversations with users. These software applications may only be able to handle simple messages from the users with whom they are communicating, and often are not accurate with their responses. These issues may result from the sheer complexity of configuring a software application to mimic the nuances of human communication in a text conversation.

SUMMARY OF THE DISCLOSURE

A processor implementing the systems and methods discussed herein may overcome the aforementioned technical deficiencies by using different machine learning models and techniques to respond to inquiries. The processor may do so depending on the context and/or content of the inquiries. The processor may, for example, be configured to respond to message queries for customer service regarding online applications. In doing so, the processor may respond to singular messages with responses about how to address a software-related issue and may additionally hold a conversation spanning multiple back-and-forth messages. The processor may be configured to generate responses to such messages using different machine learning techniques depending on whether the messages are singular or are a part of a thread. The processor may use different techniques because the messages may have different characteristics that require a different type of analysis (e.g., a thread of messages may include more content and/or have a more conversational tone that can require a different method of generating the correct response compared to singular messages). Accordingly, as the processor receives incoming messages from users over the Internet, the processor may determine the context of how the messages were received (e.g., as part of a thread or as individual messages), select the machine learning model that is associated with the context, and generate a response using the machine learning model. In this way, the processor may more accurately generate responses to queries the processor receives from client devices.

The processor may determine the technique to use to generate a response to a received message based on the content and/or context of the message itself. For instance, the processor may use natural language processing techniques to determine if a message contains an error log. An error log may be text that was generated as a result of debugging an application experiencing one or more errors. After determining the message is an error log, the processor may select a machine learning model and technique that is specific to error log messages. For instance, the processor may generate an embedding based on the error log message and separately generate embeddings of triplets from the same error log. The processor may then concatenate the embeddings together and generate a response based on the concatenated embeddings. For messages that do not contain error logs (e.g., messages that only contain natural language text), the processor may only create embeddings from the text and generate a response based on the embeddings. Finally, for threaded messages, the processor may not generate embeddings. Instead, the processor may use a machine learning model to generate a context based on all or a threshold and/or a boundary (e.g., a maximum) number of messages from the thread. The processor may decode the context and then generate a message based on the context. The techniques to generate a response for each of the different types of messages may generate a more accurate (or more proper) response than if the same techniques were used on other types of messages. Because the processor can select machine learning models and techniques to use to respond to messages in real-time, the processor may execute a more realistic message generation application than processors that use conventional message generation applications that use the same technique regardless of the context or content of the message.

Furthermore, a processor implementing the systems and methods described herein may fine-tune a machine learning model (e.g., a neural network) to generate responses to threaded messages. To do so, the processor may generate a training dataset by selecting messages that are a part of a thread of messages. The processor may then feed the selected messages through the machine learning model to generate output responses and use a loss function with back-propagation techniques and "correct" responses in an initial phase of training. The processor may then use the same or a different set of threaded messages as input into a selected layer of the machine learning model. The processor may use back-propagation techniques on those layers to fine-tune the weights and/or parameters of the layer and subsequent layers. In this way, the processor may "freeze" the selected layer and the subsequent layers to train the machine learning model to more accurately generate responses to threaded messages.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for implementing a multi-model online message generator; and Section B describes a computing environment which may be useful for practicing embodiments described herein.

A. Systems and Methods for Implementing a Multi-Model Message Response Generation System As briefly mentioned above, website and application providers are gradually discovering different methods of communicating over a network (e.g., the Internet). Examples of different communication styles include sending emails and using instant messaging applications for real-time communication. These methods of communication are useful for application customer support systems designed to help users that are having technical issues with an application on their computer. The users may use email or instant messaging communication protocols to contact a customer support agent over a network and ask for an approach or steps for resolving the technical issues.

To communicate with users having such difficulties at scale and for multiple different applications, customer support companies may resort to using a message generation application such as an email bot, a chatbot, an autoresponder, etc. The companies may do so with the goal of resolving technical issues quickly and without involving a real-world technician. However, given the complexity of creating a message generation application that can handle conversations regarding different subjects (e.g., problems involving different applications), even the most highly trained message generation applications often cannot generate realistic responses or hold a conversation with a user over multiple messages.

Figure 1:
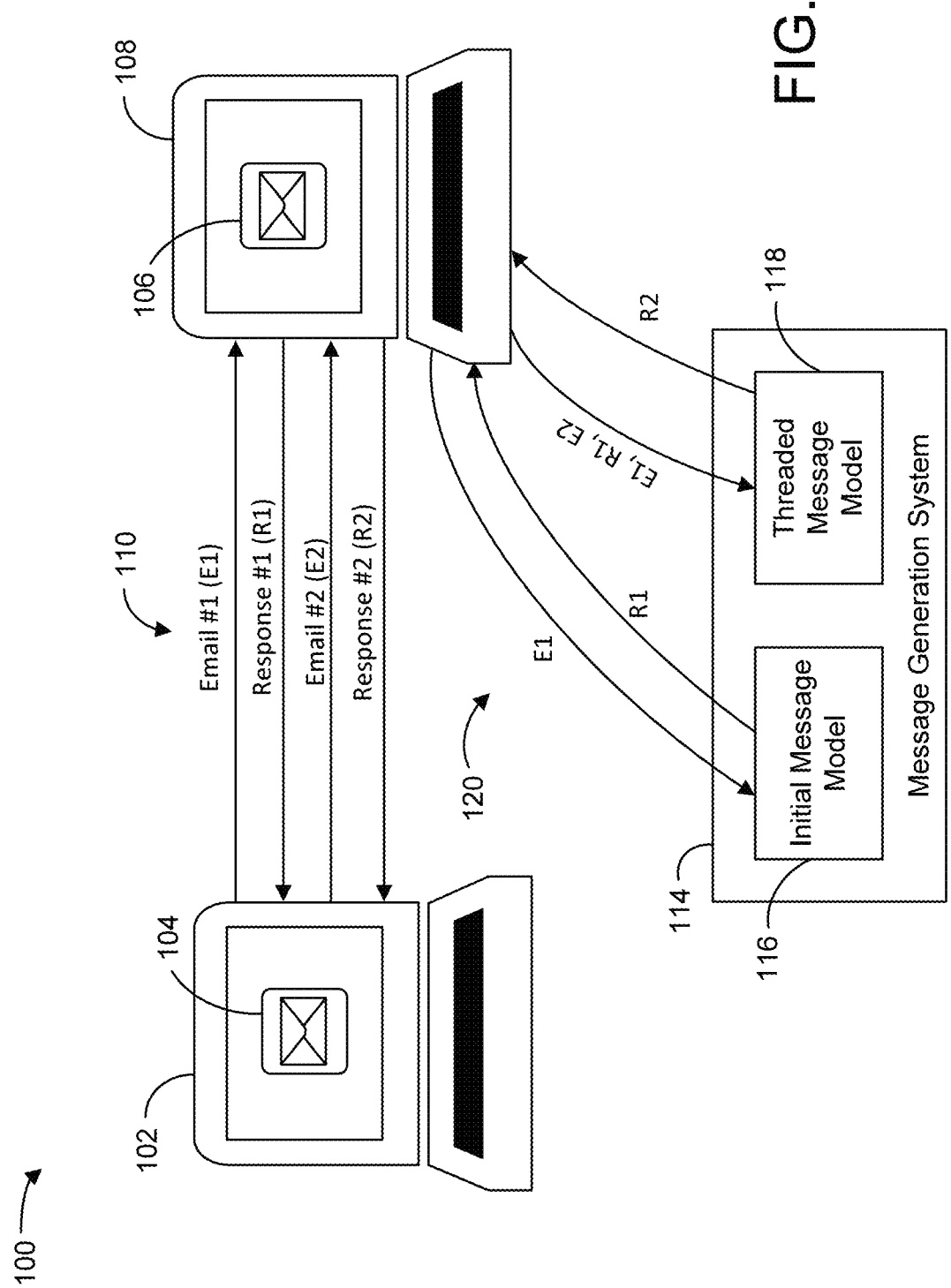
FIG. 1 is an illustration of a multi-model message response generation system communicating with a user over a network, according to some implementations.

Implementations of the systems and methods described herein overcome the aforementioned technical deficiencies by implementing a multi-model machine learning architecture. For example, referring now to FIG. 1, an illustration of a sequence 100 of a message generation system including multiple machine learning models for communicating with a user is shown, in accordance with some implementations of the systems and methods discussed herein. As illustrated, in the sequence 100, a client device 102 may execute an application 104 (e.g., a browser or an email application) to communicate with a corresponding application 106 (e.g., another browser or email application) executing on a computing device 108. The application 104 may communicate with the application 106 by exchanging messages 110 via an email or instant messaging protocol with the application 106. Upon receiving messages from the application 104, the computing device 108 may forward the received messages to a message generation system 114. Depending on the content and/or context of the messages, the message generation system 114 may execute an initial message model 116 and a threaded message model 118 to generate responses 120 to the messages the message generation model receives. The initial message model 116 may be a machine learning model that has been trained to generate natural language text to initial inquiries for resolving issues with applications that are executing on computing devices. The threaded message model 118 may be a machine learning model that has been trained to generate responses to a thread of multiple messages.

The message generation system 114 may be configured to determine the type of content in the message (e.g., whether the message includes an error log) and/or whether a message is part of a thread (e.g., a thread of multiple messages). If the message generation system 114 determines a message is not a message of a thread or includes a certain type of content, the message generation system 114 may input the message into the initial message model 116 to obtain an output response. If the message generation system 114 determines a message is a message of a thread and is not the initial message, the message generation system 114 may input the message and, in some cases, the other messages of the thread, into the threaded message model 118 to obtain an output response message. The message generation system 114 may transmit the output responses to the computing device 108, which may in turn forward the message to the client device 102. The message generation system 114 may continuously repeat this process as a user accessing the client device 102 transmits messages to the computing device 108 regarding issues the user is having with an application executing on the client device 102. Because the initial message model 116 and the threaded message model 118 are trained to handle specific types of messages and/or messages in specific contexts, the message generation system 114 executing the initial message model 116 and the threaded message model 118 may enable the computing device 118 to maintain a meaningful conversation with the user without generating junk messages or falling into a loop that is not helpful to the user requesting help, as often occur with conventional chatbot or email bot systems.

The initial message model 116 may be or include a machine learning model (e.g., a support vector machine, a neural network, random forest, etc.) that is configured to output embeddings of an initial message. The embeddings may be numerical vector representations of the text in the initial message. The embeddings may be similar to embeddings of stored problems (e.g., stored messages with similarly calculated embeddings) in the message generation system 114. The message generation system 114 may identify a stored problem with embeddings that are most similar to the embeddings of the initial message and identify a response message from memory that corresponds to the identified stored problem. Because of the likely low amount of data or text that is included in a single message, the initial message model 116 may accurately generate the correct response to initial messages that the message generation system 114 receives. However, if the message generation system 114 receives a response to the message generated by the initial message model 116, the initial message model 116 may not be able to generate an accurate response taking into account the previous messages as there may be too much text and/or context in the thread of messages to do so.

The initial message model 116 may be trained to generate responses to messages differently depending on the type of content in the messages. For instance, the initial message model 116 may be trained to generate responses to error log messages that may be generated during an application debugging process differently than natural language messages that are typed by a user. The initial message model 116 may be trained to handle error log messages differently because error log messages may not follow common syntax rules of natural human language rules. Additionally, responses to error log messages may be more objective as certain errors may more directly describe the problem an application is facing as compared to a human attempting to describe the problem (e.g., there may be a specific solution that corresponds to a certain error code in an error log). To generate a response to an error log message, the initial message model 116 may calculate embeddings of the error log message and then concatenate embeddings of triplets of the same error log message to the previously calculated embeddings. The initial message model 116 may then compare the concatenated vector to vectors of problem messages that are associated with error logs (e.g., contain or are error logs) to identify a stored problem message that is the most similar to the error log. The initial message model 116 may identify the response that corresponds to the identified problem message and generate a response message as text. Performing such techniques may enable the initial message model 116 to more accurately generate a response to error log messages than other techniques because the techniques account for text that may be more common or individually associated with specific problems according to the triplet technique. The initial message model 116 may additionally not need to rely on any context from previous messages, as may be required by the threaded message model 118.

The message generation system 114 may input an error log message into the initial message model 116 regardless of whether the error log message is the first message or a subsequent message in the thread. The message generation system 114 may do so because error log messages may contain text that is not reliant on previous messages and may not contain contextual clues that may be common in human conversations.

To generate a response to a thread of messages, the message generation system 114 may execute the threaded message model 118. The threaded message model 118 may be or include a machine learning model trained and tuned to generate responses to multiple messages. The threaded message model 118 may generate outputs such as token identifiers and logits for individual messages of a thread. The threaded message model 118 may aggregate such outputs for each message of a thread, in some cases up to a defined threshold of messages, and decode the aggregated output into a text (e.g., simple text) response to the latest message. In this way, the threaded message model 118 may generate responses to an entire thread of messages taking into account each message of the thread.

Figure 2:
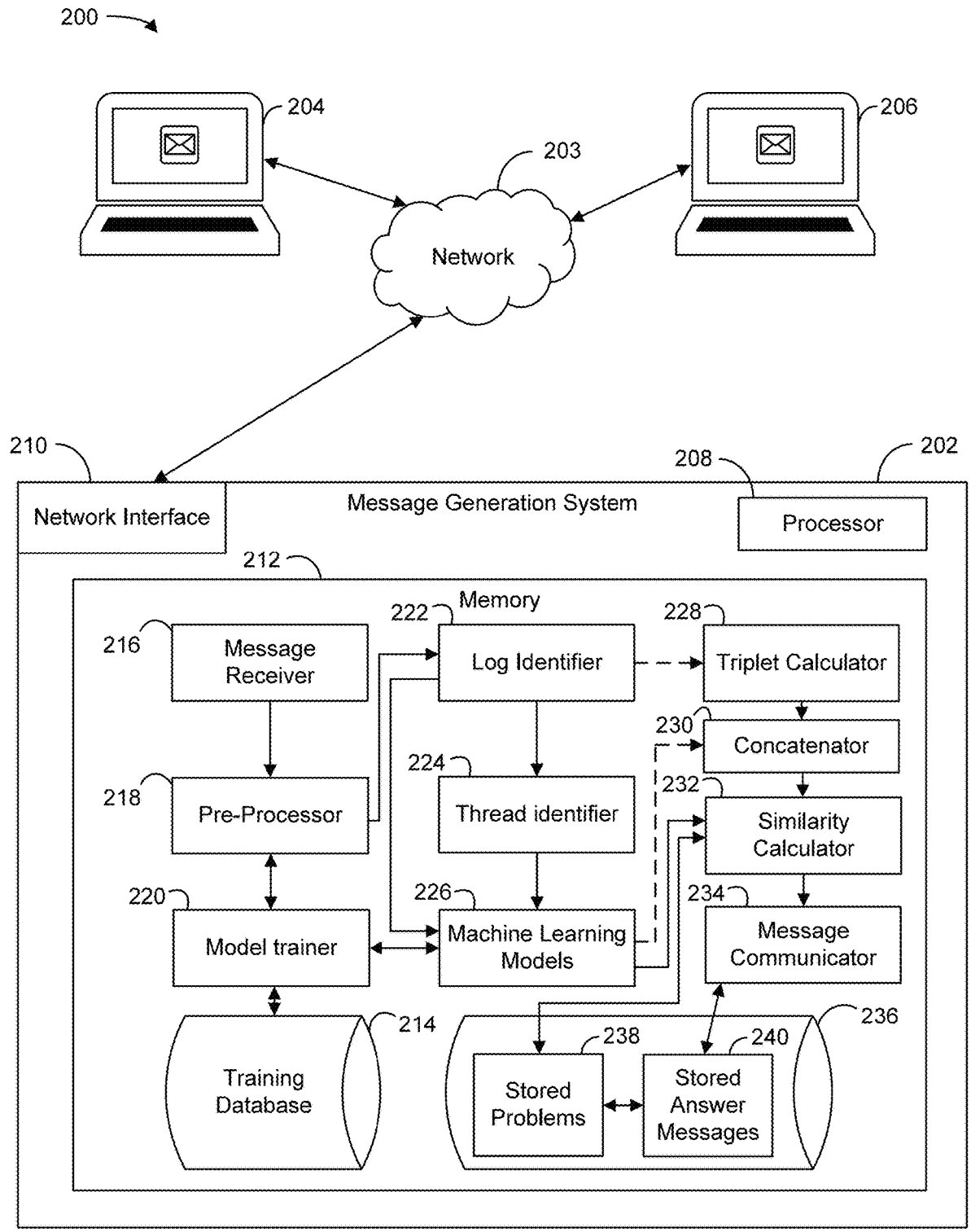
FIG. 2 is a block diagram of a system for implementing a multi-model message response generation system architecture, according to some implementations.

Referring now to FIG. 2, a block diagram of a system 200 for implementing a multi-model response generation architecture is shown, according to some implementations. The system 200 may include a message generation system 202, a network 203, a client device 204, and/or a computing device 206. The message generation system 202 may be similar to or the same as the message generation system 114, shown and described with reference to FIG. 1. The client device 204 may communicate with the computing device 206 via email or instant messages and over the network 203. Upon receiving messages from the client device 204, the computing device 206 may forward the messages to the message generation system 202. The message generation system 202 may store a series of machine learning models that can enable real-time automatic response communication with a user accessing the computing device 204. The series of machine learning models may be configured to generate responses to messages received from computing devices based on whether the messages are the first messages of a thread of messages and/or based on the content of the messages. In doing so, the message generation system 202 may enable an improved and more reliable conversation simulator for users that are requesting help with issues they are experiencing with applications executing on their computing devices, in some cases for many different applications.

The client device and/or the computing device 206 may comprise any type and form of media device or computing device, including a desktop computer, laptop computer, portable computer, tablet computer, wearable computer, embedded computer, smart television, set top box, console, Internet of Things (IoT) device or smart appliance, or any other type and form of computing device. Computing device(s) may be referred to variously as a client, device, client device, computing device, anonymized computing device or any other such term. Computing devices and intermediary modulators may receive media streams via any appropriate network, including local area networks (LANs), wide area networks (WANs) such as the Internet, satellite networks, cable networks, broadband networks, fiber optic networks, microwave networks, cellular networks, wireless networks, or any combination of these or other such networks (e.g., network 203). In many implementations, the networks may include a plurality of subnetworks which may be of the same or different types, and may include a plurality of additional devices (not illustrated), including gateways, modems, firewalls, routers, switches, etc.

The message generation system 202 may comprise one or more processors 208 (including co-processors such as graphics processing unit (GPUs) or tensor processing units (TPUs)), and/or may communicate with other devices providing co-processing power (e.g., cloud-based processing units such as virtual computing devices, desktop computing devices connected via a network, etc., for performing object recognition). The message generation system 202 may also comprise one or more network interfaces 210, such as a wireless network interface (e.g., 802.11 or Wi-Fi, cellular, or satellite network interface) and/or a wired network interface (e.g., Ethernet) for communicating with each other and/or with other computing devices via network 203, such as a Wide Area Network (WAN) such as the Internet, Local Area Network (LAN), cellular network, broadband network, peer-to-peer network, or any other type or form of network. Although not illustrated, the message generation system 202 may communicate via one or more additional devices, such as gateways, switches, routers, firewalls, accelerators, load balancers, security appliances, or other such devices. The message generation system 202 may further comprise a memory 212 (e.g., flash memory, hard drives, etc.) for storing applications (e.g., operating systems, media players, web browsers, social media applications, etc.). Memory 212 may include a training database 214, a message receiver 216, a pre-processor 218, a model trainer 220, a log identifier 222, a thread identifier 224, machine learning models 226, a triplet calculator 228, a concatenator 230, a similarity calculator 232, a message communicator 234, and a response database 236.

The message generation system 202 may retrieve message data by executing instructions stored in model trainer 220. The model trainer 220 may include executable instructions that, upon execution, cause the processor 208 to retrieve message data from the training database 214 (e.g., a relational database that stores individual messages and threads of messages). The message data may include one or more messages (e.g., emails, text messages, instant messages, etc.) exchanged between computing devices of technicians and users requesting support to resolve problem the users are having with applications executing on their computers. The message data may include incoming and/or outgoing messages. The message data may include the text and/or images that are included in the messages and metadata about the messages such as the message sender, the message recipient(s), the subject line of the message, the time the message was sent, a message signature, etc. In some implementations, the model trainer 220 may retrieve the message data upon receiving a message or thread of messages from a computing device of a user.

The model trainer 220 may identify one or more messages from the message data. The model trainer 220 may identify the one or more messages by identifying a single message that does not have any following messages (e.g., a single message from a user asking for help that was resolved after one response) or a thread of messages (e.g., a thread containing a multi-message conversation regarding one or more problems a particular user was having with an application). In some implementations, a thread of messages comprises three or more messages. The model trainer 220 may identify a single message from the message data by identifying a message and analyzing the subject line of the message and/or the contents of the message to determine if there are any more messages as a part of the thread of messages. For example, the model trainer 220 may analyze the subject line of the message and determine if the subject line begins with or contains the phrase "Re:". If the message begins with or contains the phrase "Re:", the message is likely part of a thread and not an individual message; otherwise, the model trainer 220 may determine the message is a single message.

In another example, the model trainer 220 may analyze the body of the message. Often, replies to messages contain the text from any previous messages in the same body below the message. The model trainer 220 may analyze the body and determine if there are any indicators of previous messages in the thread such as time stamps, "From:" or "To:" labels, etc. If the model trainer 220 identifies any such labels, the model trainer 220 may determine the message is a message of a thread; otherwise, the model trainer 220 may determine the message is an individual message that is not a part of a thread.

If the model trainer 220 determines the message is a single message, the model trainer 220 may only identify the single message. However, if the model trainer 220 determines the message is a message of a thread, the model trainer 220 may identify the other messages of the thread from the message data. To do so, the model trainer 220 may identify the other messages of the message data that are linked to the single message in some way such as, for example, having common senders and/or recipients or common text within the messages. In some implementations, the model trainer 220 may identify messages of a thread by identifying a flag in the message data that indicates the messages are a part of the same thread, and/or identifying messages that were grouped together with the message as a thread in memory 212.

The message generation system 202 may tokenize the identified one or more messages by executing instructions stored in the pre-processor 218. The pre-processor 218 may include executable instructions that, upon execution, cause the processor to tokenize individual words and/or phrases of messages. The pre-processor 218 may tokenize the identified one or more messages by replacing words or phrases of the one or more messages with tokens (e.g., null or predetermined strings). In some implementations, the pre-processor 218 may replace certain types of text or data with tokens that correspond with the type of text or data. For instance, the pre-processor 218 may replace email addresses with an "[EMAIL]" string token, images with an "" string token, and/or a web address with a "[URL]" string token. The pre-processor 218 may replace the words or phrases with tokens that are specific to the types of words or phrases the tokens are replacing or with a token that is common to all of the replaced words or phrases. In doing so, the pre-processor 218 may tokenize specific words or phrases in messages because the words or phrases may not aid in determining a response to a message and/or may negatively impact any calculations to determine a response to the message.

To identify the words or phrases to replace with tokens, the pre-processor 218 may use natural language processing techniques. For example, the pre-processor 218 may compare the words or sets of words of the identified one or more messages to a database (e.g., a relational database) (not shown) that contains a list of words or phrases that are to be tokenized. If the pre-processor 218 identifies any words or phrases of the one or more messages that match a word or phrase from the list, the pre-processor 218 may replace the matching words or phrases with a predefined token. In some implementations, the pre-processor 218 may replace the matching words or phrases with strings that have stored relationships with the words or phrases in the database (e.g., replace an email address with an [EMAIL] string). By including strings that are specific to the types of words or phrases (or data) that are being replaced, calculations may be performed on the text of the message with the context of the tokens, improving the accuracy of any response predictions as compared to words or phrases that may not have any meaning to the machine learning models 226.

The message generation system 202 may determine if the identified one or more messages is a single message or a thread of messages by executing instructions stored in the thread identifier 224. The thread identifier 224 may include executable instructions that, upon execution, cause the processor 208 to determine whether a message is a single message or is a message of a thread comprising multiple messages. The thread identifier 224 may do so by maintaining and incrementing a counter for each of the identified one or more messages. If the count of the counter exceeds two, the thread identifier 224 may determine the identified one or more messages is a thread of messages. If the counter equals one or two, the thread identifier 224 may determine the identified one or more messages only contain one message (e.g., a message that has a response to the message in a message pair). In such implementations, the thread identifier 224 may determine if the message is a threaded message based on whether there are multiple messages linked together or if the message is not linked to any messages as described above.

If the thread identifier 224 determines the identified one or more messages is only a single message, the message generation system 202 may execute instructions stored in the machine learning models 226 to calculate embeddings from data of the single message. The machine learning models 226 may include one or more machine learning models (e.g., a neural network, a support vector machine, random forest, etc.) that are configured to generate embeddings based on text and/or text responses to individual or multiple messages of a thread. In some implementations, the machine learning models 226 may include other instructions to generate embeddings such as code to implement Word2V and/or GloVe. In one example, the message generation system 202 may calculate the embeddings by applying the text to an STSB-Roberta-base model. In another example, the message generation system may calculate the embeddings by applying the text to a Language-agnostic Bidirectional Encoder Representations from Transformers (BERT) Sentence Encoder (LaBSE) model. The LaBSE model can support multiple language. For instance, the LaBSE can receive text in multiple languages. The LaBSE can output similar embeddings (e.g., vectors or numbers that are within a range (e.g., a defined range), have common numbers or characters, or otherwise are similar with each other) for text that has the same meaning between different languages (e.g., the LaBSE model may output similar embeddings for the phrases "hello" and "hola"). The processor 208 may execute the instructions of the machine learning models 226 to generate embeddings based on the text of the single message. The embeddings of the single message may be a numerical vector that the message generation system 202 generates based on the text of the individual message. The message generation system 202 may extract the text from the single message and execute the instructions of the machine learning models 226 to calculate the embeddings.

The message generation system 202 may store the calculated embeddings. The message generation system 202 may store the calculated embeddings in a cache file or a database in memory 212. For instance, the message generation system 202 may store the calculated embeddings with the message from which the embeddings were calculated in the database 236 as stored problems 238. In some implementations, the message generation system 202 may store the calculated embeddings in the cache file or database 236 with a stored relationship with a response to the message of the embeddings. In some embodiments, the message generation system 202 may store embeddings of different text of different languages but with the same meaning in the same cache file or with the same stored relationship with the response. In some embodiments, the message generation system 202 may store embeddings of different text in different languages in cache files or with stored relationships with responses in the same language from which the stored embeddings were generated. The response to the message may be a stored answer message 240 containing text that corresponds to the initial message. For example, if the initial message is "I am having trouble accessing a particular section of my application" the message generation system 202 may store a response with the initial message stating "Have you tried checking your settings to ensure access to the section is enabled?" The message generation system 202 may receive such responses as input or may automatically generate the response using a machine learning model (e.g., a sequence-to-sequence neural network) of the machine learning models 226 that is configured to generate responses to individual messages. Accordingly, if the message generation system 202 receives a message across the network 203 with text that is similar to the text of a single message with the stored embeddings, the message generation system 202 may use the stored relationship in the cache file or database 236 to identify the correct response to use to respond to the message.

If the thread identifier 224 determines the one or more messages are a part of a thread of multiple messages, the model trainer 220 may train a machine learning model of the machine learning models 226 to generate responses to messages of the thread using the one or more messages as input. The model trainer 220 may train the machine learning model specifically to respond to messages that are a part of a thread containing multiple messages. Upon determining the identified one or more messages from the retrieved message data are a part of a thread of messages, model trainer 220 may insert the thread of messages into the machine learning model for training.

To train the machine learning model, the model trainer 220 may insert the messages of the thread into the machine learning model in pairs. The pairs may each include an initial message from an inquiring computing device and a response message from the receiving computing device of the initial message. In cases in which the message from the inquiring computing device is the second message from the inquiring computing device, the pair may be the message itself with all previous messages and responses in the thread and the actual response to the message. The model trainer 220 may insert the initial message of a pair into the machine learning model and execute the machine learning model to generate an output response message. The model trainer 220 may compare the expected response to the message from the pair to the output response message according to a loss function. The model trainer 220 may then use back-propagation techniques on the machine learning model based on the difference between the actual response message and the output response message. In doing so, the model trainer 220 may adjust the weights and/or parameters of the machine learning model (e.g., increase or decrease the weights to make the output response message closer to the actual response message) for training.

In some implementations, the machine learning model for threaded messages may be a sequence-to-sequence neural network. The machine learning model may be configured to process and generate text responses in any language. Examples of such a machine learning model include, but are not limited to, DialoGPT and a MICROSOFT AZURE model. The sequence-to-sequence neural network may operate to generate responses to a thread of messages using an encoder and decoder, which may each include a sequence of recurrent neural networks. In operation, the encoder may receive an individual message of a thread of messages and execute to generate a context vector including logits and/or token_ids based on the text of the message. The encoder may receive each message of the thread and generate logits and/or token_ids for each message, adding the logits and/or token_ids to the context vector for each message. Upon processing each message of the thread to generate an aggregated context vector, the decoder may execute the aggregated context vector using the aggregated context vector as input to generate an output response to the latest message in the thread of messages. During training, the machine learning model may compare the output response to an actual response and use back-propagation techniques to adjust the weights and/or parameters of the machine learning model.

In some implementations, the machine learning model may be trained to generate a response to a message of a thread of messages based only on data from a threshold number (e.g., 10) of messages. For example, the machine learning model may be configured to generate responses of a thread based on the 10 most recent messages of the thread, in some cases including output and received messages. The model trainer 220 may identify such messages by identifying the time stamps of the messages of the thread (e.g., identify the messages with the most recent time stamps) and/or based on an order of the sequence of messages of the thread. If there are less than the threshold number of messages in the thread, the model trainer 220 may execute the decoder of the thread using the final context vector generated from each message of the thread and/or add buffer null characters to the context thread to generate an input that the decoder is configured to accept. By limiting the amount of messages of a thread the machine learning model uses to generate a response to a threaded message to a defined threshold, the model trainer 220 may train the machine learning model to generate accurate responses to messages using the context of a conversation without requiring too many messages to generate a response.

The model trainer 220 may train the machine learning model using such techniques until the machine learning model is trained to an accuracy threshold (e.g., the model trainer 220 determines the difference between an output response message and an actual response message is correct above a defined threshold (e.g., an output response message with a correct percentage of 90% is above an accuracy threshold of 80%)). Upon training the machine learning model to the accuracy threshold, the model trainer 220 may initiate a second stage of training the machine learning model. In the second stage, the model trainer 220 may use the same training dataset or a different training dataset to fine-tune the weights and/or parameters of specific layers of the machine learning model. For example, the machine learning model may be a sequence-to-sequence neural network having an encoder and a decoder. When performing the initial stage of the training process, the model trainer 220 may insert the training data into the first or initial layer of the encoder.

In the second stage, the model trainer 220 may insert training data into an intermediary layer (e.g., a layer subsequent to the first layer) of the machine learning model. The intermediary layer may be an intermediary layer or a final layer of the encoder. In doing so, the model trainer 220 may insert the training data into the initial or only layer of the encoding layers of the encoder, which may differ depending on the type of encoder of the model that is generating the response. To enable the intermediary layer and subsequent layers to read the input from the model trainer 220 without the input propagating through the initial layers of the encoder, the model trainer 220 may first insert the training data into a tokenizer (e.g., a deep-learning tokenizer). The tokenizer may receive the individual messages and generate digits (e.g., digits representing words or characters) from the text of the messages. The digits from the tokenizer may then be input into the intermediary or final layer of the encoder. After inserting the training data into the intermediary or final layer, the model trainer 220 may use back-propagation techniques to adjust the weights and/or parameters of the encoder layers. By doing so, the model trainer 220 may freeze the encoding layers of the neural network and focus on training the layers' accuracy, increasing the speed and the effectiveness of the training after training the entire machine learning model at once.

In some implementations, freezing the encoding layers of a machine learning model may enable the model trainer 220 to generate and/or train the machine learning model for a specific domain or project. For example, the model trainer 220 may train a machine learning model using a global training data set of threads that may be used to train multiple machine learning models. Then, upon receiving a request to generate or train a machine learning model for a specific project (e.g., a machine learning model that is dedicated to responding to messages regarding problems of a specific application, which may be identified from an application identifier or string in a message), the model trainer 220 may retrieve or receive thread data from the entity associated with the project and train the encoding layer or layers of the machine learning model using the thread data from the entity associated with the project. Thus, the model trainer 220 may be able to adequately train a machine learning model to respond to threaded messages using a global training data set while fine-tuning the machine learning model with domain-specific data to more accurately respond to messages regarding a project.

The model trainer 220 may store the trained threaded model. The model trainer 220 may store the trained threaded model in memory 212 of the message generation system 202. To do so, in some implementations, the model trainer 220 may store the trained machine learning model as a binary file, thus minimizing the amount of resources that are needed to store the machine learning model. The model trainer 220 may store the binary file in memory 212 such that the message generation system 202 may later retrieve the machine learning model to generate responses to threaded messages.

The message generation system 202 may execute instructions of the message receiver 216 to receive a message. The message receiver 216 may be or include executable instructions configured to receive messages either directly from computing devices that initially transmitted messages or through an intermediary server hosting a website with a plug-in that enables communication between such a computing device and the message generation system 202. The message may be an email, a text message, an instant message, or any other type of message that includes text and/or image data. In some implementations, the data processing system may receive the message via an application programming interface (API) executing on the computing device 206 after the computing device receives the message from the computing device 204. The API may operate as a browser plug-in that receives the message and transmits the message to the message generation system 202 for further processing. In such implementations, the message generation system 202 may receive messages transmitted by users without accessing any personal data (e.g., usernames, passwords, addresses, demographic data, etc.) stored by the computing device 206 for different users. In some implementations, the message receiver 216 may receive the message by querying an email application executing on the computing device 206. In some implementations, the message receiver 216 may receive the message directly from a computing device communicating with the message generation system 202. In some implementations, upon receiving the messages, the pre-processor 218 may pre-process the message by replacing certain types of words with tokens as is described above.

The message receiver 216 may receive single messages and/or threads of messages. For example, the message receiver 216 may receive a single message from the computing device 206. The single message may be the first contact the computing device 206 or a user account associated with the computing device 206 has with the message generation system 202 or a first contact the computing device 206 has had with the message generation system 202 within a time threshold. In another example, the message receiver 216 may receive a thread of multiple messages. The thread of multiple messages may include a newly received message and each message of a conversation that is linked to the newly received message.

In some implementations, the message receiver 216 may receive a single message and determine whether the message is a message of a thread including multiple messages. For example, the message receiver 216 may receive the message and the thread identifier 224 may compare the sender and/or recipients of the messages to senders and/or recipients of stored messages or threads in memory 212. In some cases, the thread identifier 224 may compare signatures between the message and messages in memory 212. The thread identifier 224 may determine the message is a message of a thread responsive to identifying messages' common senders and/or recipients and/or having matching signatures. In some implementations, the thread identifier 224 may determine the sender is the same sender based on the message originating and/or received by the same IP address as a previous message (e.g., the thread identifier 224 may compare the IP addresses in the data packets containing the messages and determine if the IP addresses match). In some cases, the thread identifier 224 may also compare a timestamp of the message to timestamps of the most recent messages of threads. The thread identifier 224 may compare the timestamps to the most recent messages of threads and determine if the timestamp is within a defined threshold of the most recent messages. If the timestamps of the message and the most recent message of a thread are within a threshold and have common senders, recipients, signatures, and/or IP addresses, the thread identifier 224 may determine the message is a part of the thread and retrieve every message of the thread. Otherwise, the thread identifier 224 may determine the message is a singular message and not a part of a thread.

The message generation system 202 may execute instructions included in the log identifier 222 to determine if the message is or includes an error log. The log identifier 222 may be or include executable instructions that are configured to determine whether a message is or includes text of an error log. An error log may be a computer-generated message that may be generated during a debugging process. For example, if a user is having issues with an application, the user may execute a program to debug the issue. In response to executing the program, the computer may generate a text file indicating different codes of any issues the computer encountered in executing the program. Different programs may generate error logs with different codes, even for the same problems (e.g., the same boot-up problem may have a code of "E01" for one program and "CYG" for another). A computing device may execute the debugging software to generate such an error log and transmit the error log to the message generation system 202 in a message either as an initial message or as a message of a thread containing multiple messages.

To determine whether the message is or includes an error log, the log identifier 222 may use natural language processing techniques. For instance, the log identifier 222 may compare individual words and/or phrases of the message to words and/or phrases in a database (not shown) comprising words and/or phrases that have stored associations with an error log identifier. The log identifier 222 may compare all of the words or phrases of the message to the words or phrases in the database. If the log identifier 222 determines there is a match between a single word or phrase or a number of words or phrases above a threshold with words or phrases in the database that are associated with an error log identifier, the log identifier 222 may determine the message is or includes an error log. Otherwise, the log identifier 222 may determine the message is not or does not include an error log.

Responsive to determining the message is or includes an error log, the message generation system 202 may obtain embeddings of the text in the error log message as well as embeddings of triplets of the text in the error log message. The message generation system 202 may obtain embeddings of the text in the error log message using a variety of techniques, such as, for example, executing a neural network with an embedding layer, using Word2Vec, using GloVe, etc., of the executable instructions of the machine learning models 226. The message generation system 202 may concatenate the words of the error log into a single string and generate a numerical vector embedding of the concatenated words using one of the aforementioned techniques. In doing so, the message generation system 202 may generate a numerical representation of the text of the error log that can be compared with numerical representations of stored or previously analyzed error logs.

In addition to obtaining embeddings of the text in the error log message, the message generation system 202 may calculate embeddings of triplets generated from the error log message by executing instructions included in a triplet calculator 228, which may be or include instructions executable by the processor 208 to calculate triplets from text of messages. To obtain the embeddings from the error log message, the message generation system 202 may first execute instructions in the triplet calculator 228 to calculate triplets from the error log message. In one example, the triplet calculator 228 may calculate the triplets from the error log message by calculating weighted distances between the words in the error log and identify triplets of words that have the lowest weighted distance. In another example, the triplet calculator 228 may calculate the triplets by identifying the most common words in the error log and generating triplets from the most common words. Upon calculating the triplets, the message generation system 202 may apply the same techniques (e.g., executing a neural network with an embedding layer, using Word2Vec, using GloVe, etc.) the message generation system 202 used to calculate embeddings of the entire error log message to the triplets to generate triplet embeddings of the triplets.

The message generation system 202 may execute instructions included in the concatenator 230 to concatenate the embeddings for the entire message (e.g., the message embeddings) with the triplet embeddings to generate a concatenated embedding vector. The concatenator 230 may be or include instructions executable by the processor 208 to concatenate vectors of embeddings together. The concatenator 230 may do so by adding index values to one of the vectors including the embeddings and inserting the values in the other vector into the new index values. By doing so, the message generation system 202 may have more data available in the vector to use to identify previously generated error logs that are similar to the error log included in the message.

The message generation system 202 may execute instructions included in the similarity calculator 232 to identify a defined number of problems (e.g., error logs) that are the most similar to the error log included in the message. The similarity calculator 232 may be or include instructions executable by the processor 208 to calculate similarity scores (e.g., values indicating the similarity between messages on a scale, such as 1-100). The similarity calculator 232 may identify the most similar error logs by, for example, using a cosine similarity algorithm between the concatenated embedding vector and similarly calculated embedding vectors for error logs stored in the memory 212 of the message generation system 202. Because the concatenated embedding vector for the error log includes more indices than a vector of message embeddings that is not concatenated to triplet embeddings, the similarity calculator 232 may only perform the cosine similarity algorithm on the concatenated vector and vectors in memory 212 that were similarly calculated (e.g., include message embeddings concatenated to triplet embeddings). The similarity calculator 232 may perform the cosine similarity algorithm with the embeddings that correspond to each error log in memory 212 to generate similarity scores for each error log. The similarity calculator 232 may compare the similarity scores and identify a defined number of error logs with the highest similarity scores.

The message generation system 202 may execute instructions included in the message communicator 234 to identify solutions to the identified error logs. The message communicator 234 may be or include instructions executable by the processor 208 to identify solutions to messages the message generation system 202 receives. The solutions may be response messages to the error log. The response messages may include text instructions on how to resolve any problems identified in the error log. The solutions may be included in the stored answer messages 240 of the database 236. The solutions may be stored with stored associations (e.g., relationships in a relational database) with the stored problems 238. To identify the solutions, the message communicator 234 may identify the solutions that have stored associations with the problems the similarity calculator 232 identified. The message communicator 234 may identify each solution that corresponds to the identified problems that are the most similar to the error log message.

The message communicator 234 may present messages containing the solutions on a user interface. The message communicator 234 may present the messages on the user interface as potential responses to the message. The message communicator 234 may generate and transmit the user interface containing the potential responses to the computing device 206. The technician may view the different potential responses and select the potential message the technician prefers, causing the computing device 206 to transmit the selected message to the client device 204.

If the log identifier 222 determines the message is not or does not contain an error log, the thread identifier 224 may determine if the message is the first message in a thread (e.g., is not a part of a thread containing multiple messages). The thread identifier 224 may make this determination similar to how the thread identifier 224 determines if a message is a part of a thread during the machine learning model training phase as described above (e.g., determine if the message has common senders, recipients, and/or signatures and/or timestamps within a threshold of any stored messages in memory 212 or determine if the message was sent in a thread of other messages).

If the thread identifier 224 determines the message is the first message of a thread or is otherwise not a message of a thread of messages, the message generation system 202 may obtain message embeddings of the message. Using techniques similar to those to obtain embeddings of an error log as described above, the message generation system 202 may execute a machine learning model of the machine learning models 226 to calculate the message embeddings. For instance, the message generation system 202 may use techniques such as a neural network with an embedding layer, Word2Vec, GloVe, etc., to obtain a numerical vector of embeddings for the text of the message. In some implementations, the message generation system 202 may obtain the embeddings using an STSB-Roberta-base model or a LaBSE model.

After determining the embeddings for the message, the similarity calculator 232 may identify a defined number of messages that are the most similar to the text included in the message. In doing so, the similarity calculator 232 may use a cosine similarity function between the calculated embeddings and embeddings in memory 212 that have been calculated in a similar manner. When doing so, the similarity calculator 232 may determine the similarity between the embeddings of the message and embeddings of similar non-error log messages because the similarity calculator 232 may not calculate or concatenate triplet embeddings for non-error log messages. Instead, the similarity calculator 232 may only calculate the similarity between the embeddings of the message and other similarly calculated embedding vectors. The similarity calculator 232 may do so because the cosine similarity function may require vectors to have the same or a similar number of index values to calculate the similarity (e.g., the angle) between the two vectors. The similarity calculator 232 may determine a similarity score for each problem using cosine similarity and identify a defined number of problems with the highest similarity score. The message generation system 202 may then execute the message communicator 234, retrieve potential messages to send to the computing device 206 in response to the message, present the potential messages on a user interface to a technician, and then transmit the select potential message to the computing device 206.

If the thread identifier 224 determines the message is not the first message in a thread (e.g., the message is a message of a thread containing multiple messages), a machine learning model of the machine learning models 226 may generate a response to the message based on a threshold number of messages of the thread. To do so, the message generation system 202 may retrieve and insert all or a threshold number of the most recent messages in the thread into a machine learning model (e.g., a DialoGPT or MICROSOFT AZURE model) of the machine learning models 226. The machine learning model may be a response generation model trained as described above to generate an output response to the latest message in a thread of messages. The machine learning model may be trained to output text of a specific language based on text of any language (e.g., generate text English based on text in English, Spanish, French, German, etc.). The machine learning model may output text in any language. Given the unique training method (e.g., only training the machine learning model using threads of data and fine-tuning specific layers of the machine learning model), the machine learning model may output more accurate responses to threads of messages than other machine learning models. In some implementations, the message generation system 202 may identify a defined number of messages and include each of the defined number of messages in the input to the machine learning model. The message generation system 202 may execute the machine learning model for each message or the defined number of messages in the thread to cause the machine learning model to output a text response to the received message.

The message communicator 234 may retrieve an output response from the machine learning model and transmit the output response to the computing device 206 to forward to the client device 204 to simulate an answer from a human. In some cases, the message communicator 234 may present the output response on a user interface of the computing device 206 to a technician. The technician may view the output response and selection an option to cause to cause the computing device 206 to transmit the output response to the computing device 204.

In some implementations, the message generation system 202 may store the message and the response to the message in memory 212 (e.g., in the stored problems 238 and the stored answer messages 240, respectively, of the database 236). In cases in which the message is a message of a thread, the message generation system 202 may store the message and the response with a stored association with the other messages in the thread. Accordingly, the message generation system 202 may later use the stored message and response to respond to another message in the thread if the user chooses to send another message and extend the conversation.

Figure 3:
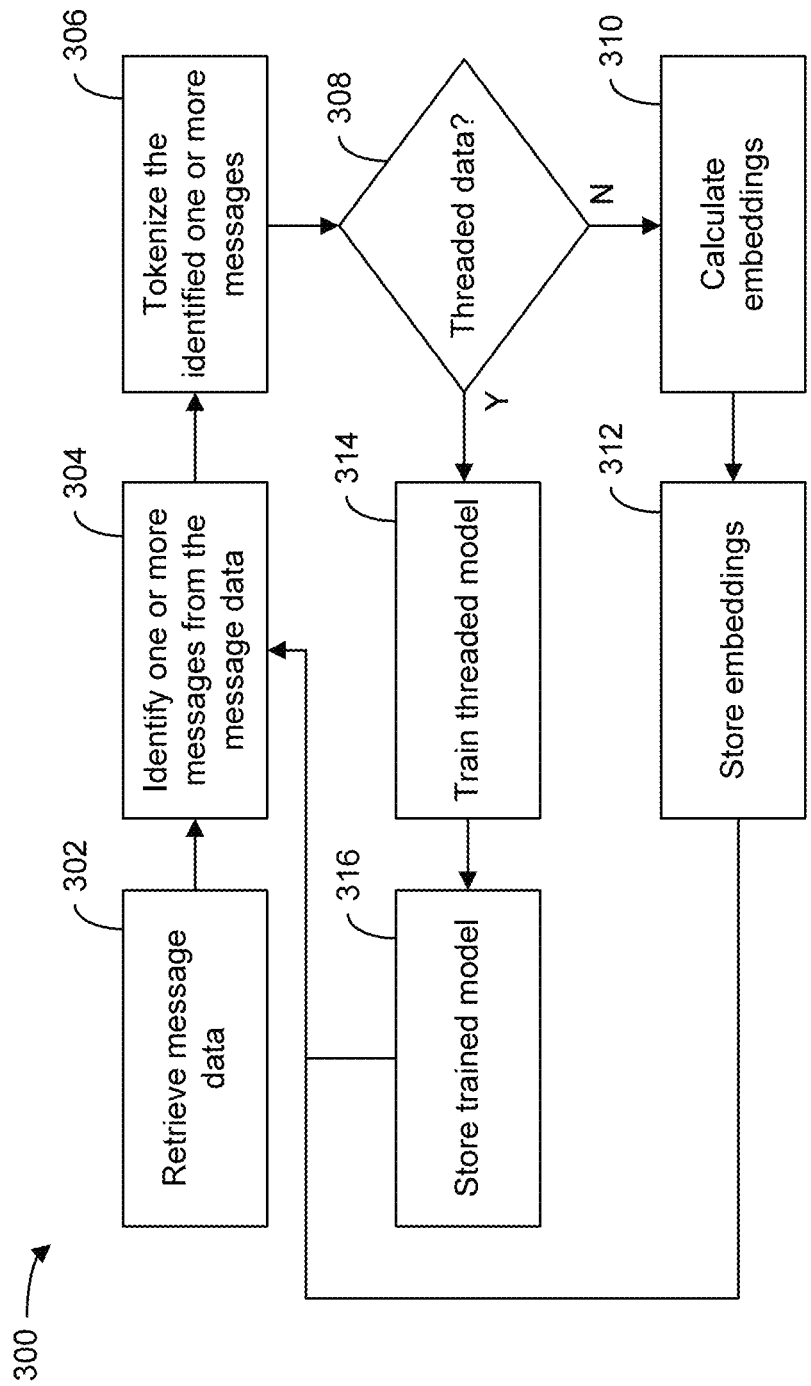
FIG. 3 is a flow chart of an implementation of a method for training a machine learning model to generate responses to threaded messages, according to some implementations.

FIG. 3 is a flow chart of an implementation of a method 300 for implementing a multi-model response generation architecture, according to some implementations. Method 300 may be performed by a data processing system (e.g., the message generation system 202, shown and described with reference to FIG. 2). The method 300 may include any number of steps and the steps may be performed in any order. Performance of method 300 may enable the data processing system to train one or more machine learning models to generate messages of a conversation in response to individual messages and/or messages of a thread. By performing the method 300, the data processing system may generate machine learning models that are more accurate than conventional machine learning models that are configured to operate as a message response generation system over a network.

At operation 302, the data processing system may retrieve message data. The data processing system may retrieve the message data from a database stored in memory of the data processing system. The message data may include one or more messages (e.g., emails, text messages, instant messages, etc.) exchanged between computing devices of technicians and users requesting support to resolve problem the users are having with applications executing on their computers. The message data may include incoming and/or outgoing messages. The message data may include the text and/or images that are included in the messages and metadata about the messages such as the message sender, the message recipient(s), the subject line of the message, the time the message was sent, a message signature, the IP addresses of the sending and recipient computing devices, etc. In some implementations, the data processing system may retrieve the message data upon receiving a message or thread of messages from a computing device of a user.

At operation 304, the data processing system may identify one or more messages from the message data. The data processing system may identify the one or more messages by identifying a single message that does not have any following messages (e.g., a single message from a user asking for help that was resolved after one response) or a thread of messages (e.g., a thread containing a multi-message conversation regarding one or more problems a particular user was having with an application). The data processing system may identify a single message from the message data by identifying a message and analyzing the subject line of the message and/or the contents of the message to determine if there are any more messages as a part of the thread of messages. For example, the data processing system may analyze the subject line of the message and determine if the subject line begins with or contains the phrase "Re:". If the message begins with or contains the phrase "Re:", the message is likely part of a thread and not an individual message; otherwise, the data processing system may determine the message is a single message.

In another example, the data processing system may analyze the body of the message. Often, replies to messages contain the text from any previous messages in the same body below the message. The data processing system may analyze the body and determine if there are any indicators of previous messages in the thread such as time stamps, "From:" or "To:" labels, etc. If the data processing system identifies any such labels, the data processing system may determine the message is a message of a thread; otherwise, the data processing system may determine the message is an individual message that is not a part of a thread.

If the data processing system determines the message is a single message, the data processing system may only identify the single message. However, if the data processing system determines the message is a message of a thread, the data processing system may identify the other messages of the thread from the message data. To do so, the data processing system may identify the other messages of the message data that are linked to the single message in some way such as, for example, having common senders and/or recipients or common text within the messages. In some implementations, the data processing system may identify messages of a thread by identifying a flag in the message data that indicates the messages are a part of the same thread, and/or identifying messages that were grouped together with the message as a thread in memory.

At operation 306, the data processing system may preprocess the identified one or more messages. The data processing system may preprocess the identified one or more messages by replacing words or phrases of the one or more messages with tokens (e.g., null or predetermined strings). In some implementations, the data processing system may replace certain types of text or data with tokens that correspond with the type of text or data. For instance, the data processing system may replace email addresses with an "[EMAIL]" string token, images with an "" string token, and/or a web address with a "[URL]" string token. The data processing system may replace the words or phrases with tokens that are specific to the types of words or phrases the tokens are replacing or with a token that is common to all of the replaced words or phrases. In doing so, the data processing system may tokenize specific words or phrases in messages because the words or phrases may not aid in determining a response to a message and/or may negatively impact any calculations to determine a response to the message.

To identify the words or phrases to replace with tokens, the data processing system may use natural language processing techniques. For example, the data processing system may compare the words or sets of words of the identified one or more messages to a database (e.g., a relational database) that contains a list of words or phrases that are to be tokenized. If the data processing system identifies any words or phrases of the one or more messages that match a word or phrase from the list, the data processing system may replace the matching words or phrases with a predefined token. In some implementations, the data processing system may replace the matching words or phrases with strings that have stored relationships with the words or phrases in the database (e.g., replace an email address with an [EMAIL] string). By including strings that are specific to the types of words or phrases (or data) that are being replaced, calculations may be performed on the text of the message with the context of the tokens, improving the accuracy of any response predictions as compared to words or phrases that may not have any meaning to the data processing system.

In some implementations, the data processing system may identify words and/or phrases to generate tokens using a machine learning model (e.g., a sequence-to-sequence neural network). In such implementations, the data processing system may insert the message into the machine learning model and the machine learning model may evaluate the text and generate a new tokenized message replacing words and/or phrases with string tokens similar to the tokens described above. Advantageously, by using a machine learning model to perform this task, the data processing system may insert tokens in the message more accurately for more types of words or phrases than using a typical word-compare approach.

In some implementations, the data processing system may rephrase "bad" text chunks of the message into text chunks that are readable to any machine learning model that is generating a response to the message. A bad text chunk may be a word or phrase of words that does not make grammatical sense or that contains a number of typographical errors, which may be common in emails or text messages from users. Such bad text chunks may lessen the accuracy of any response to the message that generated by a machine learning model because the machine learning model is configured to calculate new messages of the text at face value and without taking into account the fact that there may errors in the message.

To improve the accuracy of the response a machine learning model generates, the data processing system may replace the bad text chunks with text that does not have such errors. To do so, the data processing system may input the message into a machine learning model (e.g., a sequence-to-sequence neural network) that has been trained to recreate the message replacing bad text chunks with text without any errors. The data processing system may then generate a response to the message with the updated message, thus improving the accuracy of the response.

At operation 308, the data processing system may determine if the identified one or more messages is a single message or a thread of messages. The processing system may do so by maintaining and incrementing a counter for each of the identified one or more messages. If the count of the counter exceeds two, the data processing system may determine the identified one or more messages is a thread of messages. If the counter equals one or two, the data processing system may determine the identified one or more messages only contains one message (e.g., a message pair). In some implementations, operation 308 is a part of operation 304. In such implementations, the data processing system may determine if the message is a threaded message based on whether there are multiple messages linked together or if the message is not linked to any messages as described above.

If the data processing system determines the identified one or more messages is only a single message, at operation 310, the data processing system may calculate embeddings from data of the single message. The embeddings of the single message may be a numerical vector that the data processing system generates based on the text (including the tokens) of the individual message. The data processing system may calculate embeddings of the single message through a variety of techniques, such as, for example, executing a neural network with an embedding layer, using Word2Vec, using GloVe, etc. In one example, the data processing system may calculate the embeddings by applying the text to an STSB-Roberta-base model or a LaBSE model. The data processing system may calculate the embeddings based on text of any language. The data processing system may extract the text from the single message and use any of such techniques to calculate the embeddings.

At operation 312, the data processing system may store the calculated embeddings. The data processing system may store the calculated embeddings in a cache file or a database in memory. In some implementations, the data processing system may store the calculated embeddings in the cache file or database with a stored relationship with a response to the message of the embeddings. The response to the message may be a message containing text that corresponds to the initial message. For example, if the initial message is "I am having trouble accessing a particular section of my application" the data processing system may store a response with the initial message stating "Have you tried checking your settings to ensure access to the section is enabled?" The data processing system may receive such responses as input or may automatically generate the response using a machine learning model (e.g., a sequence-to-sequence neural network) that is configured to generate responses to individual messages. Accordingly, if the data processing system receives a message across a network with text that is similar to the text of a single message with the stored embeddings, the data processing system may use the stored relationship in the cache file or database to identify the correct response to use to respond to the message.

If at operation 308 the data processing system determines the one or more messages are a part of a thread of multiple messages, at operation 314, the data processing system may train a machine learning model to generate responses to messages of the thread using the one or more messages as input. For example, the machine learning model may be a neural network (e.g., a sequence-to-sequence neural network), a support vector machine, a random forest, etc. The data processing system may train the machine learning model specifically to respond to messages that are a part of a thread containing multiple messages. Upon determining the identified one or more messages from the retrieved message data are a part of a thread of messages, the data processing system may insert the thread of messages into the machine learning model for training.

To train the machine learning model, the data processing system may insert the messages of the thread into the machine learning model in pairs. The pairs may each include an initial message from an inquiring computing device and a response message from the receiving computing device of the initial message. In cases in which the message from the inquiring party computing device is the second message from the inquiring party computing device, the pair may be the message itself with all previous messages and responses in the thread and the actual response to the message. The data processing system may insert the initial message of a pair into the machine learning model and execute the machine learning model to generate an output response message. The data processing system may compare the expected response to the message from the pair to the output response message according to a loss function. The data processing system may then use back-propagation techniques on the machine learning model based on the difference between the actual response message and the output response message. In doing so, the data processing system may adjust the weights and/or parameters of the machine learning model (e.g., increase or decrease the weights to make the output response message closer to the actual response message) for training.

In some implementations, the machine learning model may be a sequence-to-sequence neural network. Examples of such a machine learning model include, but are not limited to, DialoGPT and a MICROSOFT AZURE model. The sequence-to-sequence neural network may operate to generate responses to a thread of messages using an encoder and decoder, which may each include a sequence of recurrent neural networks. In operation, the encoder may receive an individual message of a thread of messages and execute to generate a context vector including logits and/or token_ids based on the text of the message. The encoder may receive each message of the thread and generate logits and/or token_ids for each message, adding the logits and/or token_ids to the context vector for each message. Upon processing each message of the thread to generate an aggregated context vector, the decoder may execute the aggregated context vector using the aggregated context vector as input to generate an output response to the latest message in the thread of messages. During training, the machine learning model may compare the output response to an actual response and use back-propagation techniques to adjust the weights and/or parameters of the machine learning model.

In some implementations, the machine learning model may be trained to generate a response to a message of a thread of messages based only on data from a threshold number (e.g., 10) of messages. For example, the machine learning model may be configured to generate responses of a thread based on the 10 most recent messages of the thread. The data processing system may identify such messages by identifying the time stamps of the messages of the thread (e.g., identify the messages with the most recent time stamps) and/or based on an order of the sequence of messages of the thread. If there are less than the threshold number of messages in the thread, the data processing system may execute the decoder of the thread using the final context vector and/or add buffer null characters to the context thread to generate an input that the decoder is configured to accept. By limiting the amount of messages of a thread the machine learning model uses to generate a response to a threaded message to a defined threshold, the data processing system may train the machine learning model to generate accurate responses to messages using the context of a conversation without requiring too many messages to generate a response.

The data processing system may train the machine learning model using such techniques until the machine learning model is trained to an accuracy threshold (e.g., the data processing system determines the difference between an output response message and an actual response message is correct above a defined threshold (e.g., an output response message with a correct percentage of 90% is above an accuracy threshold of 80%)). Upon training the machine learning model to the accuracy threshold, the data processing system may initiate a second stage of training the machine learning model. In the second stage, the data processing system may use the same training dataset or a different training dataset to fine-tune the weights and/or parameters of specific layers of the machine learning model. For example, the machine learning model may be a sequence-to-sequence neural network having an encoder and a decoder. When performing the initial stage of the training process, the data processing system may insert the training data into the first or initial layer of the encoder.

In the second stage, the data processing system may insert training data into an intermediary layer (e.g., a layer subsequent to the first layer) of the machine learning model. The intermediary layer may be an intermediary layer or a final layer of the encoder. In doing so, the data processing system may insert the training data into an initial encoding layer of the encoder. To insert the training data into the intermediary or final layer of the encoder, the model trainer 220 may first insert the training data into a tokenizer (e.g., a deep-learning tokenizer). The tokenizer may receive the individual messages and generate digits (e.g., digits representing words or characters) from the text of the messages. The digits from the tokenizer may then be input into the intermediary or final layer of the encoder. After inserting the training data into the intermediary or final layer, the model trainer 220 may use back-propagation techniques to adjust the weights and/or parameters of the encoder layers. In this way, the data processing system may freeze the encoding layers of the encoder. After inserting the training data into the intermediary layer, the data processing system may use back-propagation techniques to adjust the weights and/or parameters of the intermediary layer that received the training data and/or any subsequent layers of the encoder and/or decoder. In performing any of such techniques, the data processing system may focus on training the accuracy of specific subsets of layers of the neural network, increasing the speed and the effectiveness of the training as opposed to training the entire machine learning model at once.

At operation 316, the data processing system may store the trained threaded model. The data processing system may store the trained threaded model in memory of the data processing system. To do so, in some implementations, the data processing system may store the trained machine learning model as a binary file, thus minimizing the amount of resources that are needed to store the machine learning model. The data processing system may store the binary file in memory such that the data processing system may later retrieve the machine learning model to generate responses to threaded messages.

The data processing system may repeat the operations 304-316 of the method 300 for each message and/or thread the data processing system retrieved in operation 302. In doing so, the data processing system may iteratively train the machine learning model to respond to threads of messages and create embeddings that the data processing system may use to respond to individual messages. The data processing system may repeat the method 300 over time at defined intervals or as the data processing system receives threads or individual messages. In this way, the data processing system may train the machine learning model and generate embeddings in real-time, thus enabling the data processing system to continue improving the operation of the message response generation system.

Advantageously, by performing the method 300, the data processing system may both train a machine learning model to more accurately generate responses to messages of a thread and generate embeddings for singular messages for more accurate responses to singular messages. As will be described in more detail below, when the data processing system receives a message from a computing device across a network, the data processing system may determine whether the message is a message of a thread or a singular message and then use the embeddings or the trained machine learning model to generate a response. In this way, the data processing system may more accurately generate responses to messages than conventional message response generation systems that use a single machine learning model to generate responses to all messages.

Figure 4:
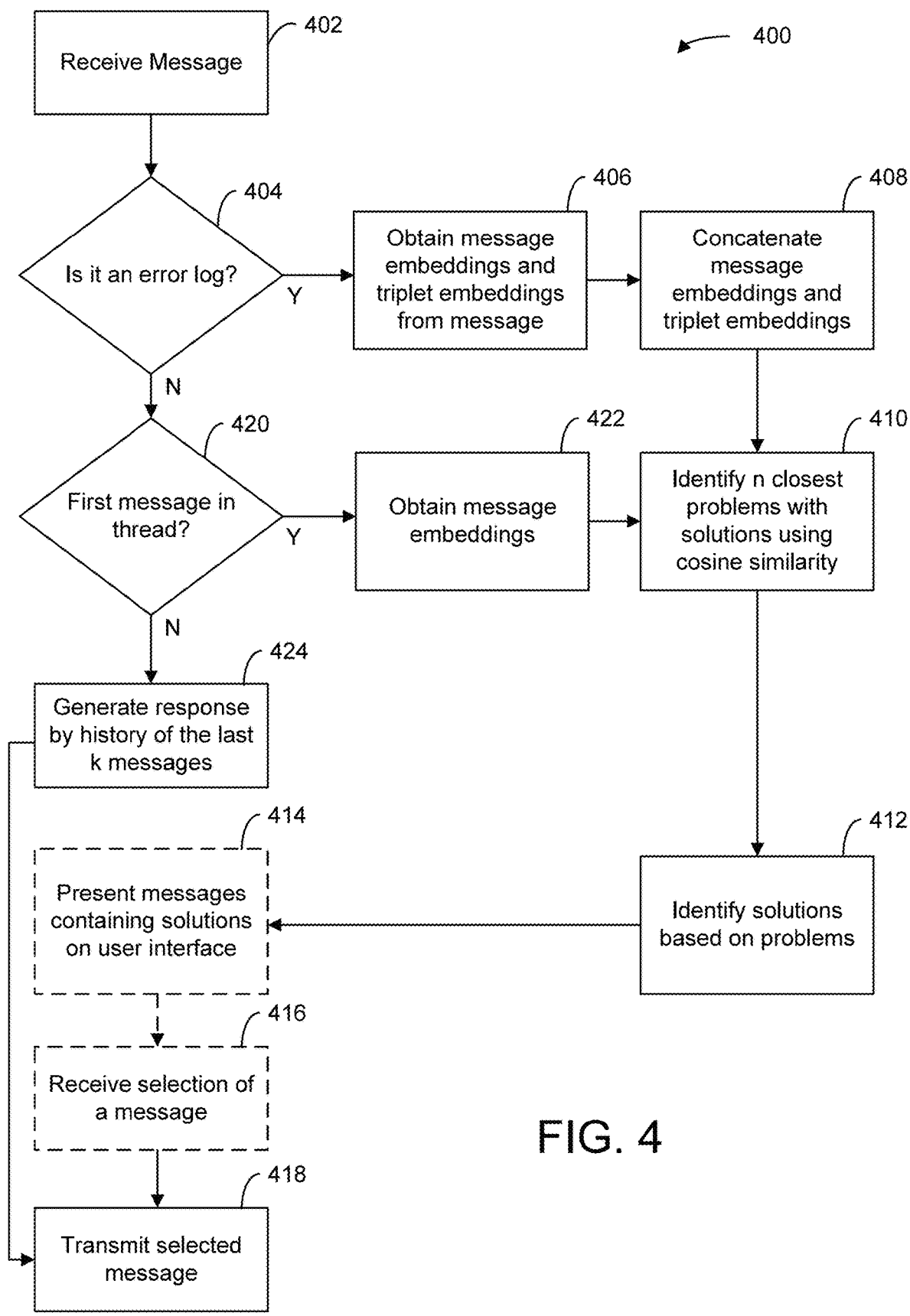
FIG. 4 is a flow chart of an implementation of a method for implementing a multi-model message response generation system, according to some implementations.

FIG. 4 is a flow chart of an implementation of a method 400 for implementing a multi-model message response generation system architecture, according to some implementations. Method 400 may be performed by a data processing system (e.g., the message generation system 202, shown and described with reference to FIG. 2). The method 400 may include any number of steps and the steps may be performed in any order. Performance of method 400 may enable the data processing system to maintain a conversation with a user over a network while taking into the context and content of the messages the user sends the data processing system. The data processing system may do so using a unique machine learning architecture that enables the data processing system to generate and transmit messages with a higher degree of accuracy and taking into account more and different types of information.

At operation 402, the data processing system may receive a message. The message may be an email, a text message, an instant message, or any other type of message that includes text and/or image data. In some implementations, the data processing system may receive the message by querying an email application executing on a computing device. In some implementations, the data processing system may receive the message directly from a computing device communicating with the data processing system. In some implementations, upon receiving the messages, the data processing system may pre-process the message by replacing certain types of words with tokens, as is described with respect to operation 306 of FIG. 3.

The data processing system may receive single messages and/or threads of messages. For example, the data processing system may receive a single message from a computing device. The single message may be the first contact the computing device or a user account associated with the computing device has with the data processing system or a first contact the computing device has had with the data processing system within a time threshold. In another example, the data processing system may receive a thread of multiple messages. The thread of multiple messages may include a newly received message and each message of a conversation that is linked to the newly received message.

In some implementations, the data processing system may receive a single message and determine whether the message is a message of a thread including multiple messages. For example, the data processing system may receive the message and compare the sender and/or recipients of the message to senders and/or recipients of stored messages or threads in memory. In some cases, the data processing system may compare signatures between the message and messages in memory. The data processing system may determine the message is a message of a thread responsive to identifying messages' common senders and/or recipients and/or having matching signatures. In some implementations, the data processing system may determine the sender is the same sender based on the message originating from the same IP address as a previous message. In some cases, the data processing system may also compare a timestamp of the message to timestamps of the most recent messages of threads. The data processing system may compare the timestamps to the most recent messages of threads and determine if the timestamp is within a defined threshold of the most recent messages. If the timestamps of the message and the most recent message of a thread are within a threshold and have common senders, recipients, and/or signatures, the data processing system may determine the message is a part of the thread and retrieve every message of the thread. Otherwise, the data processing system may determine the message is a singular message and not a part of a thread.

At operation 404, the data processing system may determine if the message is or includes an error log. An error log may be a computer-generated message that may be generated during a debugging process. For example, if a user is having issues with an application, the user may execute a program to debug the issue. In response to executing the program, the computer may generate a text file indicating different codes of any issues the computer encountered in executing the program. Different programs may generate error logs with different codes, even for the same problems (e.g., the same boot-up problem may have a code of "E01" for one program and "CYG" for another). A computing device may execute the debugging software to generate such an error log and transmit the error log to the data processing system in a message either as an initial message or as a message of a thread containing multiple messages.

To determine whether the message is or includes an error log, the data processing system may use natural language processing techniques. For instance, the data processing system may compare individual words and/or phrases of the message to words and/or phrases in a database comprising words and/or phrases that have stored associations with an error log identifier. The data processing system may compare all of the words or phrases of the message to the words or phrases in the database. If the data processing system determines there is a match between a single word or phrase or a number of words or phrases above a threshold with words or phrases in the database that are associated with an error log identifier, the data processing system may determine the message is or includes an error log. Otherwise, the data processing system may determine the message is not or does not include an error log.

Responsive to determining the message is or includes an error log, at operation 406, the data processing system may obtain embeddings of the text in the error log message as well as embeddings of triplets of the text in the error log message. The data processing system may obtain embeddings of the text in the error log message using a variety of techniques, such as, for example, executing a neural network with an embedding layer, using Word2Vec, using GloVe, etc. The data processing system may concatenate the words of the error log into a single string and generate a numerical vector embedding of the concatenated words using one of the aforementioned techniques. In doing so, the data processing system may generate a numerical representation of the text of the error log that can be compared with numerical representations of stored or previously analyzed error logs.

In addition to obtaining embeddings of the text in the error log message, the data processing system may calculate embeddings of triplets generated from the error log message. To do so, the data processing system may first calculate triplets from the error log message. In one example, the data processing system may calculate the triplets from the error log message by calculating weighted distances between the words in the error log and identify triplets of words that have the lowest weighted distance. In another example, the data processing system may calculate the triplets by identifying the most common words in the error log and generating triplets from the most common words. Upon calculating the triplets, the data processing system may apply the same techniques (e.g., executing a neural network with an embedding layer, using Word2Vec, using GloVe, etc.) the data processing system used to calculate embeddings of the entire error log message to the triplets to generate triplet embeddings of the triplets.

At operation 408, the data processing system may concatenate the embeddings for the entire message (e.g., the message embeddings) with the triplet embeddings to generate a concatenated embedding vector. The data processing system may do so by adding index values to one of the vectors including the embeddings and inserting the values in the other vector into the new index values. By doing so, the data processing system may have more data available in the vector to use to identify previously generated error logs that are similar to the error log included in the message.

At operation 410, the data processing system may identify a defined number of problems (e.g., error logs) that are the most similar to the error log included in the message. The data processing system may identify the most similar error logs by, for example, using a cosine similarity algorithm between the concatenated embedding vector and similarly calculated embedding vectors for error logs stored in memory of the data processing system. Because the concatenated embedding vector for the error log includes more indices than a vector of message embeddings that is not concatenated to triplet embeddings, the data processing system may only perform the cosine similarity algorithm on the concatenated vector and vectors in memory that were similarly calculated (e.g., include message embeddings concatenated to triplet embeddings). The data processing system may perform the cosine similarity algorithm with the embeddings that correspond to each error log in memory to generate similarity scores for each error log. The data processing system may compare the similarity scores and identify a defined number of error logs with the highest similarity scores.

At operation 412, the data processing system may identify solutions to the identified error logs. The solutions may be response messages to the error log. The response messages may include text instructions on how to resolve any problems identified in the error log. The solutions may be stored in the same database as the problems. The solutions may be stored in memory with stored associations (e.g., relationships in a relational database) with the problems. To identify the solutions, the data processing system may identify the solutions that have stored associations with the problems the data processing system identified in operation 410. The data processing system may identify each solution that corresponds to the identified problems that are the most similar to the error log message.

At operation 414, the data processing system may present messages containing the solutions on a user interface. The data processing system may present the messages on the user interface as potential responses to the message. The data processing system may generate and transmit the user interface containing the potential responses to a computing device of a technician. The technician may view the different potential responses and select the potential message the technician prefers. At operation 416, the data processing system may receive the selection. At operation 418, the data processing system may transmit a message containing the selected potential response to the computing device that initially transmitted the error log message or to the server hosting the website in communication with the computing device for the server to forward to the computing device. In some implementations the data processing system identifies the solution with the highest similarity and proceeds to operation 418 to transmit a message containing the identified solution to the computing device.

If at operation 404 the data processing system determines the message is not or does not contain an error log, at operation 420, the data processing system may determine if the message is the first message in a thread (e.g., is not a part of a thread containing multiple messages). The data processing system may make this determination similar to how the data processing system determines if a message is a part of a thread in operation 308 of FIG. 3 (e.g., determine if the message has common senders, recipients, and/or signatures and/or timestamps within a threshold of any stored messages in memory or determine if the message was sent in a thread of other messages).

If the data processing system determines the message is the first message of a thread or is otherwise not a message of a thread of messages, at operation 422, the data processing system may obtain message embeddings of the message. Using techniques similar to those to obtain embeddings of an error log as described above, the data processing system may calculate the message embeddings using a neural network. For instance, the data processing system may use techniques such as a neural network with an embedding layer, Word2Vec, GloVe, etc., to obtain a numerical vector of embeddings for the text of the message. In some implementations, the data processing system may obtain the embeddings using an STSB-Roberta-base model or a LaBSE model.

After determining the embeddings for the message at operation 422, the data processing system may perform operation 410 and identify a defined number of messages that are the most similar to the text included in the message. In doing so, the data processing system may use a cosine similarity function between the calculated embeddings and embeddings in memory that have been calculated in a similar manner. When doing so, the data processing system may determine the similarity between the embeddings of the message and embeddings of similar non-error log messages because the data processing system may not calculate or concatenate triplet embeddings for non-error log messages. Instead, the data processing system may only calculate the similarity between the embeddings of the message and other similarly calculated embedding vectors. The data processing system may do so because the cosine similarity function may require vectors to have the same or a similar number of index values to calculate the similarity (e.g., the angle) between the two vectors. The data processing system may determine a similarity score for each problem using cosine similarity and identify a defined number of problems with the highest similarity score. The data processing system may then repeat operation 412-418 in the same manner as described above to respond to the initial message from the computing device.

If at operation 420 the data processing system determines the message is not the first message in a thread (e.g., the message is a message of a thread containing multiple messages), at operation 424, the data processing system may generate a response to the message based on a threshold number of messages of the thread. To do so, the data processing system may retrieve and insert all or a threshold number of the most recent messages in the thread into a machine learning model (e.g., a DialoGPT or MICROSOFT AZURE model). The machine learning model may be a response generation model trained as described with reference to FIG. 3 to generate an output response to the latest message in a thread of messages. Given the unique training method (e.g., only training the machine learning model using threads of data and fine-tuning specific layers of the machine learning model), the machine learning model may output more accurate responses to threads of messages than other machine learning models. In some implementations, the data processing system may identify a defined number of messages and include each of the defined number of messages in the input to the machine learning model. The data processing system may execute the machine learning model for each message or the defined number of messages in the thread to cause the machine learning model to output a text response to the received message.

The data processing system may retrieve an output response from the machine learning model and, at operation 418, transmit the output response to the computing device (or a server in communication with the computing device) to simulate an answer from a human. In some cases, the data processing system may present the output response on a user interface to a technician and transmit the output response to the computing device responsive to receiving an input from the technician to transmit the message.

In some implementations, the data processing system may store the message and the response to the message in memory. In cases in which the message is a message of a thread, the data processing system may store the message and the response with a stored association with the other messages in the thread. Accordingly, the data processing system may later use the stored message and response to respond to another message in the thread if the user chooses to send another message and extend the conversation.

In one example embodiment, the data processing system may use different machine learning models and/or message processing techniques to generate responses for a single thread of messages. For instance, the data processing system may receive a message from a computing device querying for assistance in handling a problem with an application. The data processing system may determine the message is not associated with a thread and does not contain an error log. Accordingly, the data processing system may calculate an embedding for the text of the message and generate a response message based on the calculated embedding, transmit the response to the computing device, and store the initial message and the response message in memory. The data processing system may receive a second message from the same computing device. The data processing system may determine the second message is a part of a thread based on the same computing device transmitting the message, the second message having the same sender, recipient, and/or signature as the original message, and/or the message having a timestamp within a threshold amount of time of the response to the original message. Upon determining the second message is a message of a thread, the data processing system may retrieve the messages of the thread and input the second message and the message of the thread into a machine learning model that is trained to generate output response messages based on a thread of messages. The data processing system may execute the machine learning model and transmit an output response message to the computing device to continue the conversation with the user at the computing device. The data processing system may continue the conversation over time in the same manner using messages from the thread, in some cases a threshold number of the most recent messages, to generate new messages at each instance. In this way, the data processing system may hold a conversation with a user using a multi-model message response generation system architecture.

Figure 5:
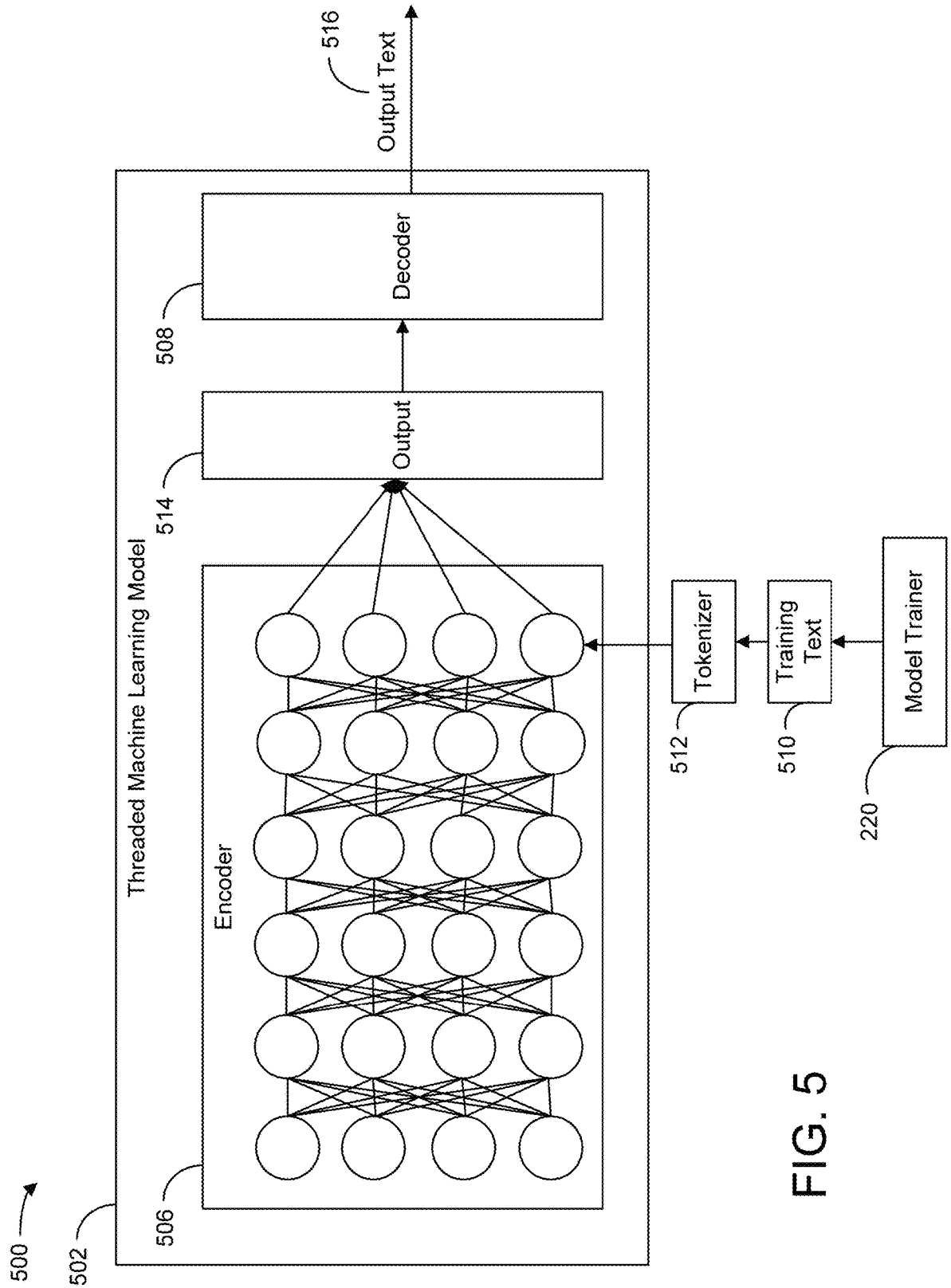
FIG. 5 is an illustration of a sequence for training a machine learning model to generate responses to threaded messages, according to some implementations.

Referring now to FIG. 5, an illustration of a sequence 500 for training a machine learning model to generate responses to threaded messages is shown, according to some implementations. The components illustrated in FIG. 5 may be the same as or similar to the components of the system 200, shown and described with reference to FIG. 2. Performance of the sequence 500 may enable a machine learning model to generate responses to threaded messages (e.g., messages that are a part of a thread of messages and that are not the first message) more accurately than conventional machine learning models.

In the sequence 500, the model trainer 220 may fine-tune a threaded machine learning model 502 to more accurately generate responses to threaded messages. The threaded machine learning model 502 may be a sequence-to-sequence machine learning model that is configured to output text responses to text inputs based on the words and phrases of the text inputs. The threaded machine learning model 502 may include an encoder 506 and a decoder 508.

In some implementations, the encoder 506 and/or the decoder 508 may include one or more recurrent neural networks. The encoder 506 may be configured to receive a text input (e.g., a message comprising a text question) and generate a vector including a context as token identifiers and/or logits. The encoder 506 may be configured to generate such vectors using text that is in any language as input. The encoder 506 may generate the vector using internal weights and/or parameters on the text input. The decoder 508 may be configured to receive the vector from the encoder 506 and generate a text output (e.g., a response to a question). Similar to the encoder 506, the decoder 508 may generate the text output using internal weights and/or parameters on the vector. Accordingly, the encoder 506 and the decoder 508 may operate in tandem to generate text responses to text inputs.

The decoder 508 may be configured to output text in the same language regardless of the language of the text that is input into the encoder 506. For example, the encoder 506 may generate a first embedding based on text in English that includes or is the string "Hi." The encoder 506 may generate a second embedding based on text in Spanish that includes or is the string "Hola." The first embedding and the second embedding may be the same or similar because both strings of text have the same meaning. The decoder 508 may process the first embedding to output first text. The decoder 508 may process the second embedding to output second text. Because the first embedding and the second embedding are the same or similar, the first text and the second text may be the same. Thus, the threaded machine learning model 502 may be able to receive and process text of any language to output text. In some embodiments, the decoder 508 may output text that is in the same language as the input text (e.g., the embedding generated by the encoder 506 may correspond to an output in the same language as the input text).

The threaded machine learning model 502 may generate a single text response for multiple messages of a single thread. The threaded machine learning model 502 may do so using a few methods. For example, in some implementations, the encoder 506 may receive a thread of messages. The encoder 506 may output context for each message separately and sequentially (e.g., the order of the messages within the thread). In doing so, the encoder 506 may continue aggregating the output context to a vector for each message until the encoder 506 has processed (e.g., applied weights and/or parameters) each message of the thread. The decoder 508 may then generate output text based on the aggregated vector. In some implementations, alternatively, the threaded machine learning model 502 (or a computer executing the threaded machine learning model 502) may concatenate the text of each message of the thread and input the concatenated text into the encoder 506. The encoder 506 may output a single vector from the concatenated vector, and the decoder 508 may generate output text based on the single vector. In this way, the threaded machine learning model 502 may generate a response based on each message of the thread.

Each of the encoder 506 and the decoder 508 may be trained using a supervised learning method. In the supervised learning method, text messages are input into the encoder 506. The encoder 506 may generate a vector output based on the text messages. The decoder 508 may receive the vector output and generate a text output based on the vector. The model trainer 220 training the threaded machine learning model 502 may be configured to implement a loss function to train the encoder 506 and/or decoder 508 in which the model trainer 220 evaluates the individual words of the output text of the decoder 508 and calculates an accuracy of the output based on the number of words that are correct compared to the number of words that are incorrect, which the computer may determine based on labels for the text input. The model trainer 220 may use back-propagation techniques on the threaded machine learning model 502 based on the loss function to train the threaded machine learning model 502.

The model trainer 220 may train the threaded machine learning model 502 in multiple stages. In a first stage, the model trainer 220 may train the threaded machine learning model 502 by providing training data into the initial layer of the encoder 506 for training. The model trainer 220 may continue providing training data into the initial layer of the encoder 506 until the threaded machine learning model 502 is trained to an accuracy threshold.

Next, as is illustrated in the sequence 500, in a second stage, the model trainer 220 may fine-tune the training of the threaded machine learning model 502. The model trainer 220 may fine-tune the training of the threaded machine learning model 502 by inserting training text 510 into an intermediary layer or final layer of the encoder 506. In doing so, the model trainer may insert the training text 510 into an initial encoding layer of the encoder 506. In some implementations, the model trainer 220 may insert the training text 510 into a final layer of the encoder 506 because the encoder 506 may only have one encoding layer at its last layer.

In some implementations, to input the training text 510 into the initial encoding layer of the encoder 506, the model trainer 220 may first insert the training text 510 into a tokenizer 512. The tokenizer 512 may be or include a machine learning model (e.g., a deep learning model) configured to generate numerical digits representing words and/or characters for individual messages of the training text 510. The tokenizer 512 may receive the training text 510 and insert the numerical digits into the initial encoding layer of the encoder 506.

The encoder 506 may receive the training text 510 at the initial encoding layer and propagate the training text 510 through to the rest of the encoding layers of the encoder 506 to generate an output vector 514 (e.g., an output vector comprising logits and/or tokens). The decoder 508 may receive the output vector 512 and generate output text 516 based on the output vector 512. The model trainer 220 may then use back-propagation techniques to adjust the weights of the decoder 508 and the encoder 506. When adjusting the weights of the encoder 506, the model trainer 220 may adjust the weights only of the layers through which the training text 510 (e.g., one or more threads of messages) propagated or of all of the layers of the encoder 506. By fine-tuning the weights of the threaded machine learning model 502 in this way, the model trainer 220 may focus training on specific layers of the encoder 506. In doing so, the model trainer 220 may ensure specific layers of the encoder 506 are more accurate and are trained more quickly instead of in small incremental steps as may occur when the model trainer 220 adjusts the weights or parameters of every layer of the encoder 506.

An example of code indicating the modified training method of the encoder 506 is below:

```
{ for param in encoder.parameters( ):
    param.requires_grad = False
    linear = torch.nn.Linear(in_features=1024,
    out features=len(state['tag_dictionary']), bias=True, device='cuda')
    state['state_dict']['linear.weight'] = linear.weight
    State['state_dict']['linear.bias'] = linear.bias
    model = SequenceTagger._init_model_with_state_dict(state)
    trainer = ModelTrainer(model, corpus)
}
```

Figure 6:
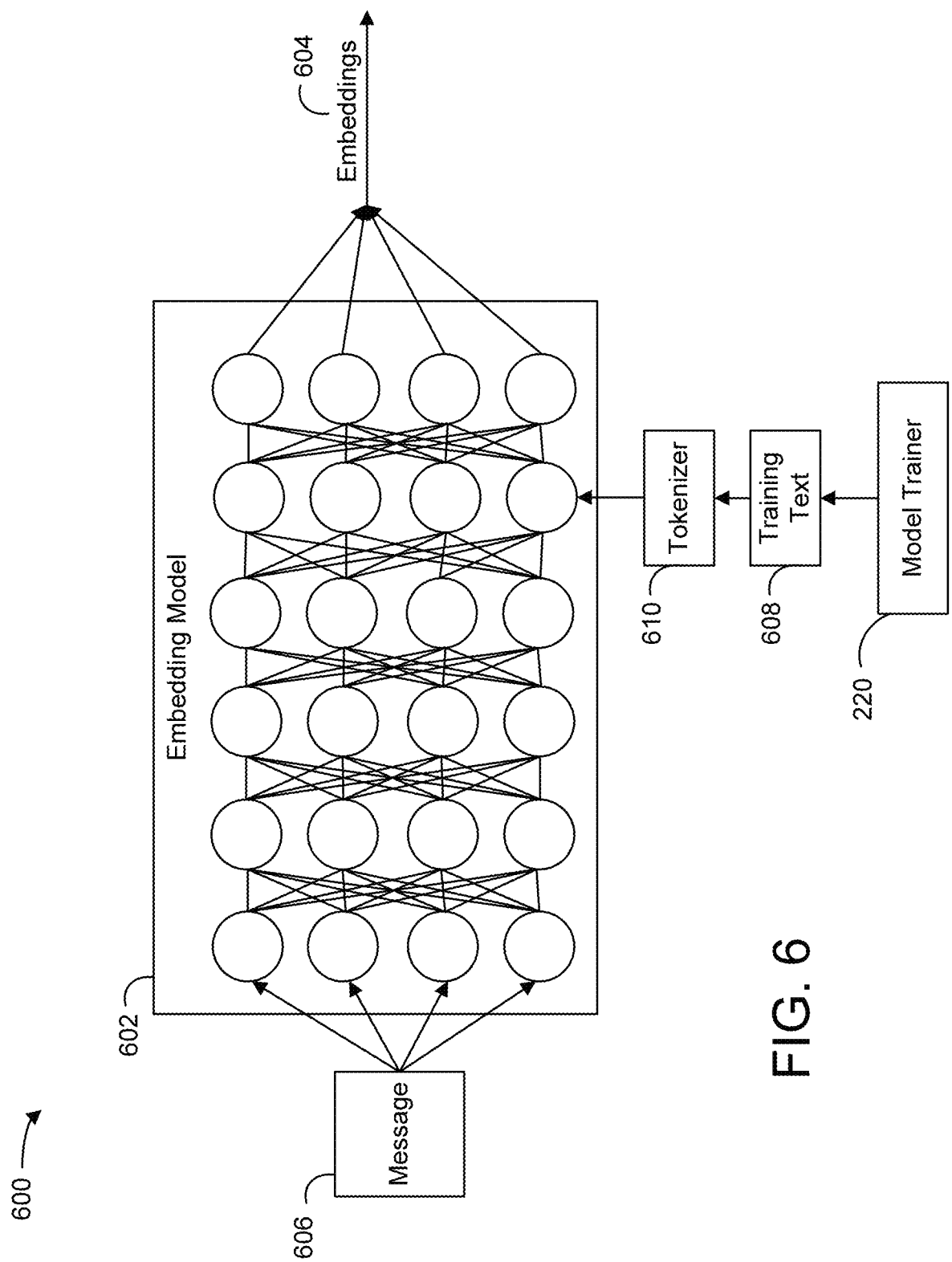
FIG. 6 is an illustration of a sequence for generating embeddings of a message, according to some implementations.

Referring now to FIG. 6, an illustration of a sequence 600 for generating embeddings of a single message is shown, according to some implementations. The sequence 600 may be performed by a data processing system (e.g., the message generation system 202, shown and described with reference to FIG. 2). In the sequence 600, an embedding model 602 may generate a vector of embeddings 604 from text of a single message 606. The embedding model 602 may be configured to generate embeddings using a variety of techniques, such as, for example, a neural network with an embedding layer, Word2Vec, GloVe, etc. The embedding model 602 may be configured to generate such vectors using text that is in any language as input. The embedding model 602 may be a machine learning model of the initial message model 116 and/or the machine learning models 226. The embedding model 602 may receive the message 606, which may have previously been determined to be an initial message of a thread. The embedding model 602 may generate the vector of embeddings 604 from the message 606. The vector of embeddings 604 may later be used by the data processing system to identify a stored problem that is associated with the vector of embeddings 604 and a response that corresponds to the identified stored problem.

In some implementations, the model trainer 220 may train the embedding model 602 in two stages similar to how the model trainer 220 trained the threaded machine learning model as described herein. For example, the model trainer 220 may first train the embedding model 602 to an accuracy threshold by inserting training data into the initial layer of the embedding model 602. After reaching the accuracy threshold, the model trainer 220 may fine tune the encoding layers of the embedding model by inserting training text 608 into the initial layer of the encoding layers of the embedding model. In doing so, the model trainer 220 may insert the training text 608 into a tokenizer 610 (which may be the same or similar to the tokenizer 512, shown and described with reference to FIG. 5). The tokenizer 610 may generate digits for individual messages of the training text 608 that represent characters or words of the individual messages. The tokenizer 610 may then insert the digits into the initial encoding layer of the encoder 602, which may then generate embeddings for training only the encoding layers of the embedding model 602. Thus, the model trainer 220 may fine-tune the embedding model 602 to generate messages for specific domain or projects similar to the threaded machine learning model 502.

Figure 7:
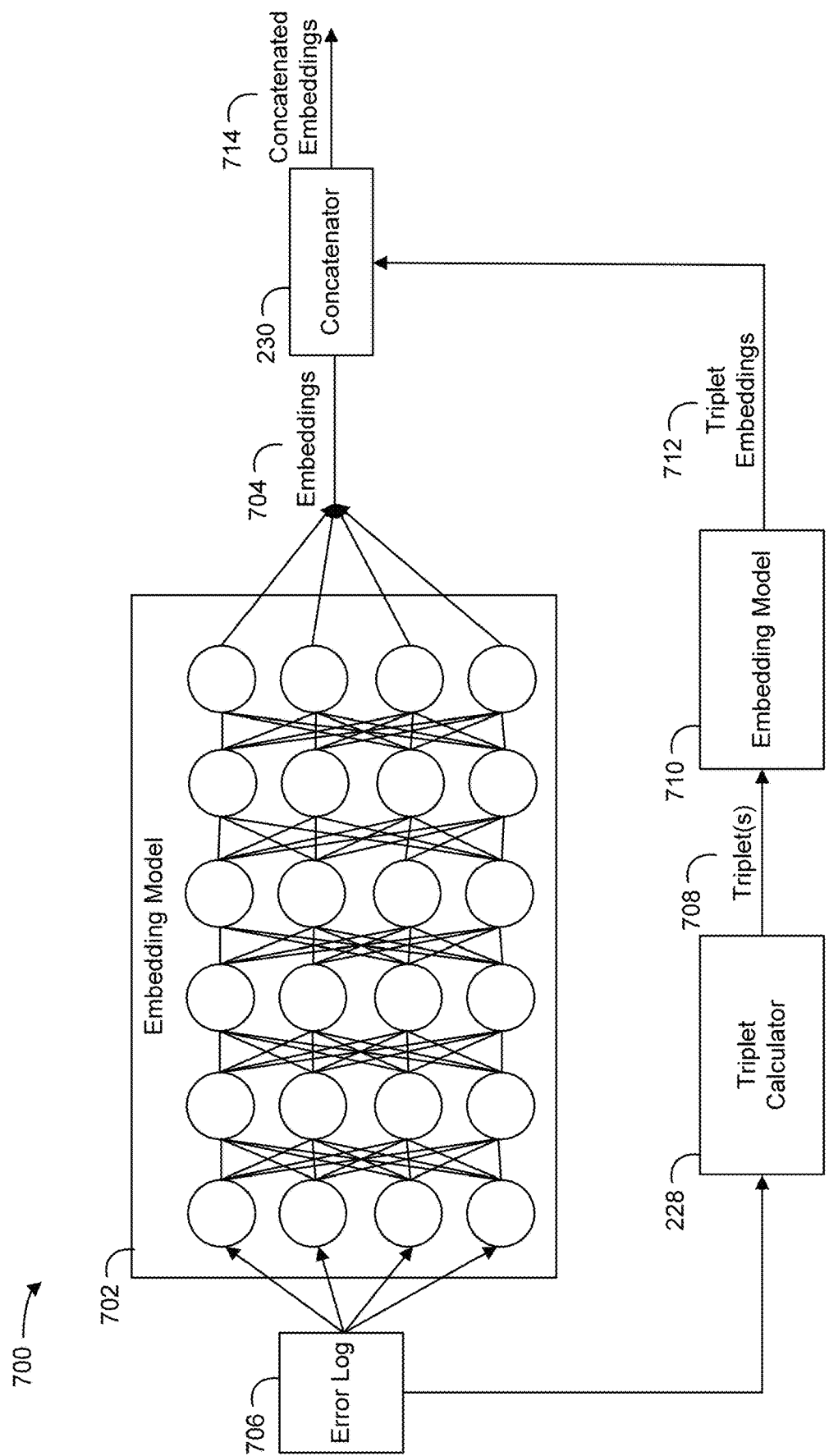
FIG. 7 is an illustration of a sequence for generating a concatenated vector of embeddings of a message containing an error log, according to some implementations.

FIG. 7 is an illustration of a sequence 700 for generating a concatenated vector of embeddings of a message containing an error log, according to some implementations. The sequence 700 may be performed by a data processing system (e.g., the message generation system 202, shown and described with reference to FIG. 2). In the sequence 700, an embedding model 702 may generate a vector of embeddings 704 from text of an error log message 706. The embedding model 702 may be the same as or similar to the embedding model 602, shown and described with reference to FIG. 6. The embedding model 702 may receive the error log message 706, which may have previously been determined to be an error log message, and generate the vector of embeddings 704 from the error log message 706.

In addition to the embedding model 702 generating the vector of embeddings 704, the triplet calculator 228 may generate triplets 708 based on the same error log message 706. The triplet calculator 228 may generate the triplets by identifying one or more sets of the most common words from the error log message 706. The triplet calculator may generate the triplets using techniques such as, but not limited to, machine learning techniques (e.g., support vector machine techniques), counting techniques, grouping words together using weighted distances, etc. The triplet calculator 228 may generate the triplets 708 and insert the triplets 708 into an embedding calculator 710 (e.g., an embedding model that is the same as or similar to the embedding model 702) to calculate triplet embeddings 712 from the triplets 708.

Upon generating the vector of embeddings 704 and the triplet embeddings 712 from the error log message 706, the data processing system may execute the concatenator 230 to concatenate the embeddings together. The concatenator 230 may concatenate the embeddings together by adding new index values to one of the vectors of embeddings 704 or the triplet embeddings 712 and inserting values from the other vector into the new index values. In doing so, the concatenator 230 may generate a vector of concatenated embeddings 714, which the data processing system may use to generate a response to the error log message 706.

Figure 8:
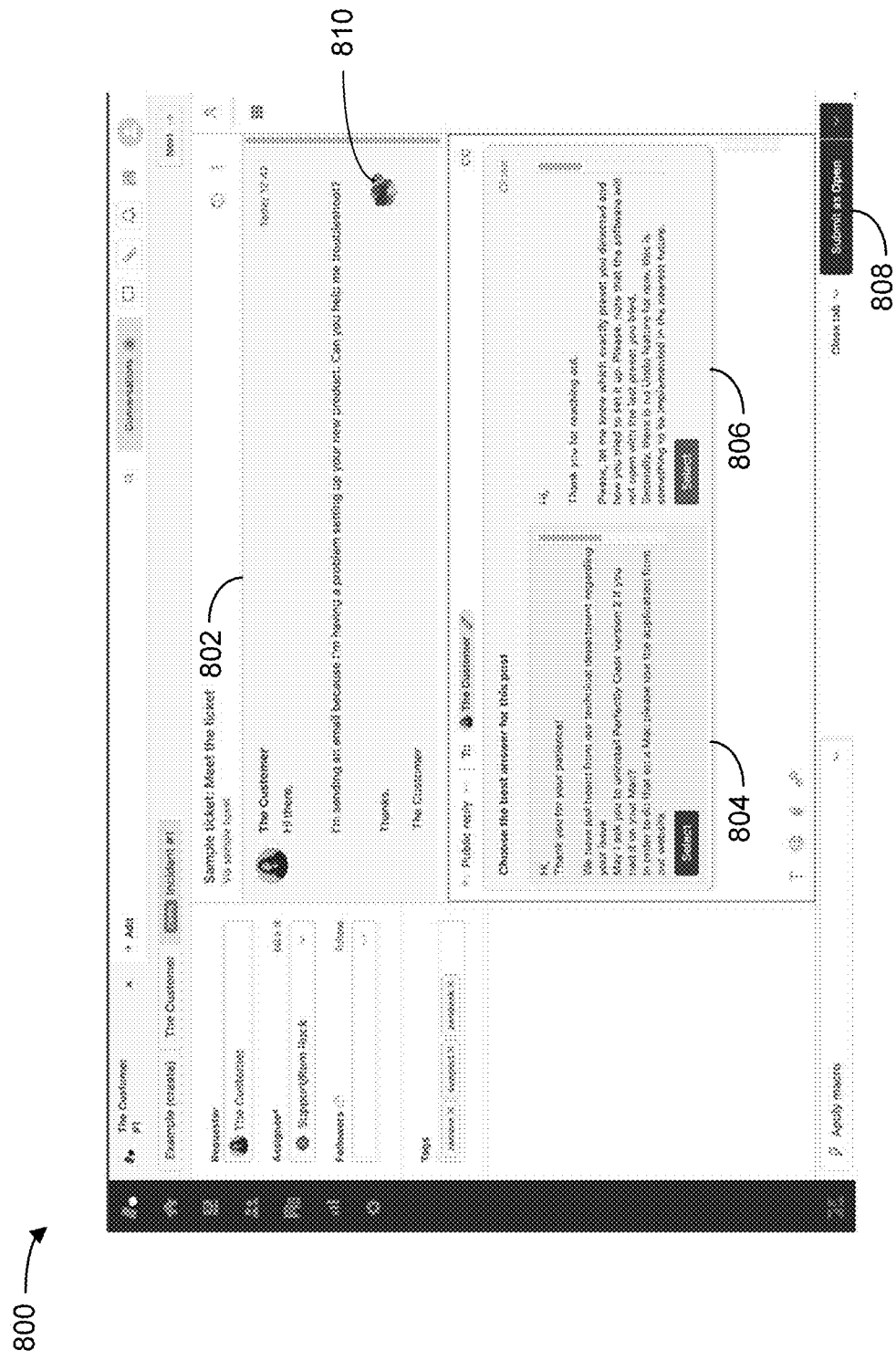
FIG. 8 is an illustration of a user interface for presenting potential responses to a message from a user, according to some implementations.

Referring now to FIG. 8, an illustration of a user interface 800 for presenting potential responses to a message from a user is shown, according to some implementations. A data processing system (e.g., message generation system 202) may generate the user interface 800 and transmit the user interface 800 to a technician to provide the technician with options of responses to transmit in response to a message. For example, a user accessing a computing device (e.g., computing device 204) may transmit a message 802 to a computing device (e.g., the computing device 206) being accessed by a technician. The message 802 may be an initial message of a request for assistance in installing a new application on the computing device. The computing device being accessed by the technician may transmit the message 802 to the data processing system. In some implementations, the computing device may automatically transmit the message 802 to the data processing system upon receipt of the message 802. The data processing system may receive the message, determine the message is an initial message and identify two stored problems that are the most similar to the message 802 using the systems and methods described herein. The data processing system may identify the answers or responses that correspond to the two stored problems and present the answers or responses on the user interface 800 as potential responses 804 and 806.

The technician may view the user interface 800 may view the responses 804 and 806. The technician may select the response the technician wants to send to the user that sent the message 802. Upon selecting one of the responses 804 and 806, the computing device the technician is accessing may transmit the selected response to the client device that sent the message or the computing device 806 may send the selected message in response to receiving an input of a submit button 808. In this way, the data processing system may automatically generate messages that a technician may use to send to users, thus ensuring technicians can use the message generation functionality described herein to automatically generate response messages and to provide an element of supervision of the final messages that are sent to users.

In some implementations, a technician may initiate the processes described herein by selecting a button on a user interface of an email application. For example, the technician may access a computing device that receives the message 802. Upon receiving the message 802, a plug-in operating on the computing device may insert a selectable button 810 onto the user interface 800 or into the message 810. The technician may select the selectable button 810, which may cause the computing device to transmit the message 802 (and, in some cases, any other messages of a thread linked to the message 802) to the data processing system. The data processing system may generate the responses 804 and 806 and transmit the responses 804 and 806 back to the technician. The technician may select the response to transmit to the client device that transmitted the message 802.

In one aspect, the present disclosure describes a system for training a multi-model message response generation system architecture. The system may include one or more processors coupled to memory and configured to identify a first plurality of messages; for a first message of the first plurality of messages, determine that the first message is a message of a thread consisting of a single message; responsive to determining that the message is a message of a thread consisting of a single message, i) generate an embedding based on text included in the first message, and ii) store the embedding in a cache file; for a second message of the first plurality of messages, determine that the second message is a message of a thread comprising multiple messages; and responsive to determining that the second message is a message of a thread comprising multiple messages, train a response generation model using a second plurality of messages included in the thread of the second message, the response generation model used to generate responses to messages belonging to threads comprising multiple messages.

In some implementations, the one or more processors are configured to generate the embedding by calculating one or more numerical vector representations of the text. In some implementations, the one or more processors are configured to train the response generation model using the second plurality of messages by inserting each of the second plurality of messages into an intermediary layer of the response generation model. In some implementations, the one or more processors are further configured to train the response generation model to an accuracy above a threshold using a set of training data, wherein the one or more processors are configured to train the response generation model using the second plurality of messages by inserting each of the second plurality of messages into an intermediary layer of the response generation model in response to the response generation model being trained to an accuracy above the threshold. In some implementations, the response generation model is a neural network.

In some implementations, the one or more processors are configured to insert each of the second plurality of messages into the intermediary layer of the response generation model by inserting each of the second plurality of messages into a final layer of an encoder of the neural network. In some implementations, the one or more processors are further configured to identify the plurality of second messages from the thread of multiple messages by identifying a threshold number of messages from the thread. In some implementations, the one or more processors are further configured to identify the threshold number of messages from the thread by identifying the most recent threshold number of messages from the thread.

In some implementations, the one or more processors are further configured to identify one or more words of a predetermined type from the first message or the second message; and replace the identified one or more words with a token prior to determining whether the first message or the second message is a message of a thread comprising multiple messages. In some implementations, the one or more processors are configured to generate the embedding by inserting the text included in the first message into a machine learning model and executing the machine learning model.

In another aspect, the present disclosure describes a method for training a multi-model message response generation system architecture. The method may comprise identifying, by a processor, a first plurality of messages; for a first message of the first plurality of messages, determining, by the processor, that the first message is a message of a thread consisting of a single message; responsive to determining that the message is a message of a thread consisting of a single message, i) generating, by the processor, an embedding based on text included in the first message, and ii) storing, by the processor, the embedding in a cache file; for a second message of the first plurality of messages, determining, by the processor, that the second message is a message of a thread comprising multiple messages; and responsive to determining that the second message is a message of a thread comprising multiple messages, training, by the processor, a response generation model using a second plurality of messages included in the thread of the second message, the response generation model used to generate responses to messages belonging to threads comprising multiple messages.

In some implementations, the method may comprise generating, by the processor, the embedding by calculating one or more numerical vector representations of the text. In some implementations, training the response generation model using the second plurality of messages comprises inserting, by the processor, each of the second plurality of messages into an intermediary layer of the response generation model. In some implementations, the method further comprises training, by the processor, the response generation model to an accuracy above a threshold using a set of training data, wherein training the response generation model using the second plurality of messages comprises inserting, by the processor, each of the second plurality of messages into an intermediary layer of the response generation model in response to the response generation model being trained to an accuracy above the threshold. In some implementations, the response generation model is a neural network.

In some implementations, inserting each of the second plurality of messages into the intermediary layer of the layer of the response generation model comprises inserting, by the processor, each of the second plurality of messages into a final layer of an encoder of the neural network. In some implementations, the method further comprises identifying, by the processor, the plurality of second messages from the thread of multiple messages by identifying a threshold number of messages from the thread.

In some implementations, identifying the threshold number of messages from the thread comprises identifying, by the processor, the most recent threshold number of messages from the thread. In some implementations, the method further comprises identifying, by the processor, one or more words of a predetermined type from the first message or the second message; and replacing, by the processor, the identified one or more words with a token prior to determining whether the first message or the second message is a message of a thread comprising multiple messages. In some implementations, generating the embedding comprises inserting, by the processor, the text included in the first message into a machine learning model and executing the machine learning model.

In one aspect, the present disclosure is directed to a system for a multi-model message response generation system. The system may include one or more processors coupled to memory. The one or more processors may be configured to identify a first message for which a first response is to be generated; determine that the first message is an initial message of a thread or includes an error log; responsive to determining that the first message is the initial message of the thread or includes an error log: identify, from a plurality of stored problems, at least one stored problem based on a similarity of the at least one stored problem with data included with the first message; identify a first solution to the at least one stored problem; and generate, using the first solution, the first response to the first message; identify a second message corresponding to the thread for which a second response is to be generated; determine that the second message is not the initial message of the thread; responsive to determining that the second message is not the initial message of the thread: provide, to a response generation model, as input, the second message and one or more previous messages and responses to the previous messages, the response generation model i) trained using a plurality of message threads including two or more messages and responses and ii) configured to provide output data to include in a second response to the second message; and generate, using the output data of the response generation model, the second response to the second message.

In some implementations, the one or more processors are further configured to determine that the first message does not include an error log prior to determining that the first message is the initial message of the thread. In some implementations, the one or more processors are further configured to calculate first embeddings from the first message; and identify at least one stored problem by calculating a similarity score between the first embeddings from the first message and second embeddings of the at least one stored problem.

In some implementations, the one or more processors are configured to determine the first message includes an error log, and the one or more processors are further configured to identify one or more triplets from the first message in response to determining the first message includes an error log; calculate one or more triplet embeddings from the one or more triplets; and concatenate the triplet embeddings to the first embeddings to generate a concatenated vector. The one or more processors may be further configured to calculate the similarity score between the first embeddings from the first messages and the second embeddings by calculating the similarity score between the concatenated vector and the second embeddings. In some implementations, the one or more processors are configured to calculate first embeddings from the first message; and calculate the similarity score between the first embeddings and the second embeddings using a cosine similarity function. In some implementations, the one or more previous messages and responses to previous messages include the first message and the first response.

In some implementations, the one or more previous messages and responses to previous messages does not include the first message, and the first response responsive to determining that a number of messages or responses between the first message and the second message is greater than a threshold. In some implementations, the first message is an email identifying an email address, and the first message is processed to replace the email addresses with a token. In some implementations, the first message is an email. In some implementations, the one or more processors are configured to generate the first response by identifying a predetermined number of stored problems with a highest similarity with the first message; presenting one or more potential responses that correspond to the predetermined number of stored problems; and generating the first response responsive to receiving a selection of one of the one or more potential responses. In some implementations, the one or more processors are further configured to transmit the first response to a computing device that transmitted the first message.

In some implementations, the output data is second output data and the second response is a second potential response, and the response generation model is further configured to provide first output data to include in a first potential response to the second message; and the one or more processors are further configured to generate, using the first output data of the response generation model, the first potential response to the second message; present the first potential response and the second potential response on a user interface; and transmit the first potential response or the second potential response to a client device that transmitted the second message responsive to receiving a selection of the transmitted first potential response or second potential response.

In another aspect, a method for implementing a multi-model message response generation system architecture is described. The method may comprise identifying, by a processor, a first message for which a first response is to be generated; determining, by the processor, that the first message is an initial message of a thread or includes an error log; responsive to determining that the first message is the initial message of the thread or includes an error log identifying, by the processor from a plurality of stored problems, at least one stored problem based on a similarity of the at least one stored problem with data included with the first message; identifying, by the processor, a first solution to the at least one stored problem; and generating, by the processor using the first solution, the first response to the first message; identifying, by the processor, a second message corresponding to the thread for which a second response is to be generated; determining, by the processor, that the second message is not the initial message of the thread; responsive to determining that the second message is not the initial message of the thread, providing, by the processor, to a response generation model, as input, the second message and one or more previous messages and responses to the previous messages, the response generation model i) trained using a plurality of message threads including two or more messages and responses and ii) configured to provide output data to include in a second response to the second message; and generating, by the processor using the output data of the response generation model, the second response to the second message.

In some implementations, determining that the first message is an initial message of a thread or includes an error log comprises determining, by the processor, that the first message does not include an error log prior to determining that the first message is the initial message of the thread. In some implementations, the method further comprises calculating, by the processor, first embeddings from the first message; and identifying, by the processor, at least one stored problem by calculating a similarity score between the first embeddings from the first message and second embeddings of the at least one stored problem.

In some implementations, determining that the first message is an initial message of a thread or includes an error log comprises determining, by the processor, that the first message includes an error log, and further comprising identifying, by the processor, one or more triplets from the first message in response to determining the first message includes an error log; calculating, by the processor, one or more triplet embeddings from the one or more triplets; and concatenating, by the processor, the triplet embeddings to the first embeddings to generate a concatenated vector. Calculating the similarity score between the first embeddings from the first messages and the second embeddings comprises calculating, by the processor, the similarity score between the concatenated vector and the second embeddings. In some implementations, the method may further comprise calculating, by the processor, first embeddings from the first message; and calculating, by the processor, the similarity score between the first embeddings and the second embeddings using a cosine similarity function.

In some implementations, the one or more previous messages and responses to previous messages include the first message and the first response. In some implementations, the one or more previous messages and responses to previous messages do not include the first message and the first response responsive to determining, by the processor, that a number of messages or responses between the first message and the second message is greater than a threshold. In some implementations, the first message is an email identifying an email address, and the method further comprises processing the first message to replace the email addresses with a token. In some implementations, identifying the first message comprises identifying an email.

B. Computing Environment

Having discussed specific embodiments of the present solution, it may be helpful to describe aspects of the operating environment as well as associated system components (e.g., hardware elements) in connection with the methods and systems described herein.

Figure 9A:
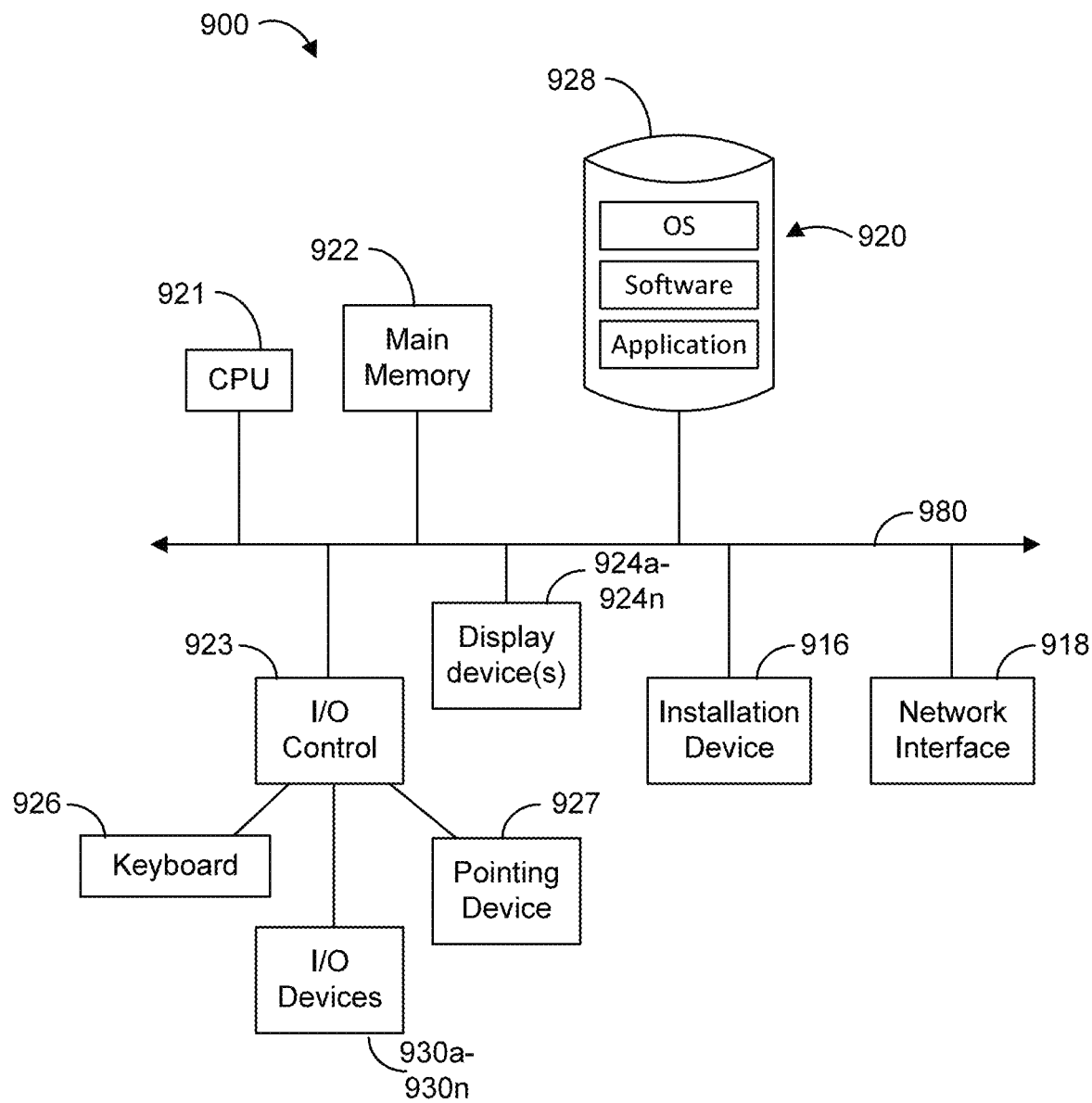
FIGS. 9A and 9B are block diagrams depicting embodiments of computing devices useful in connection with the methods and systems described herein.
Figure 9B:
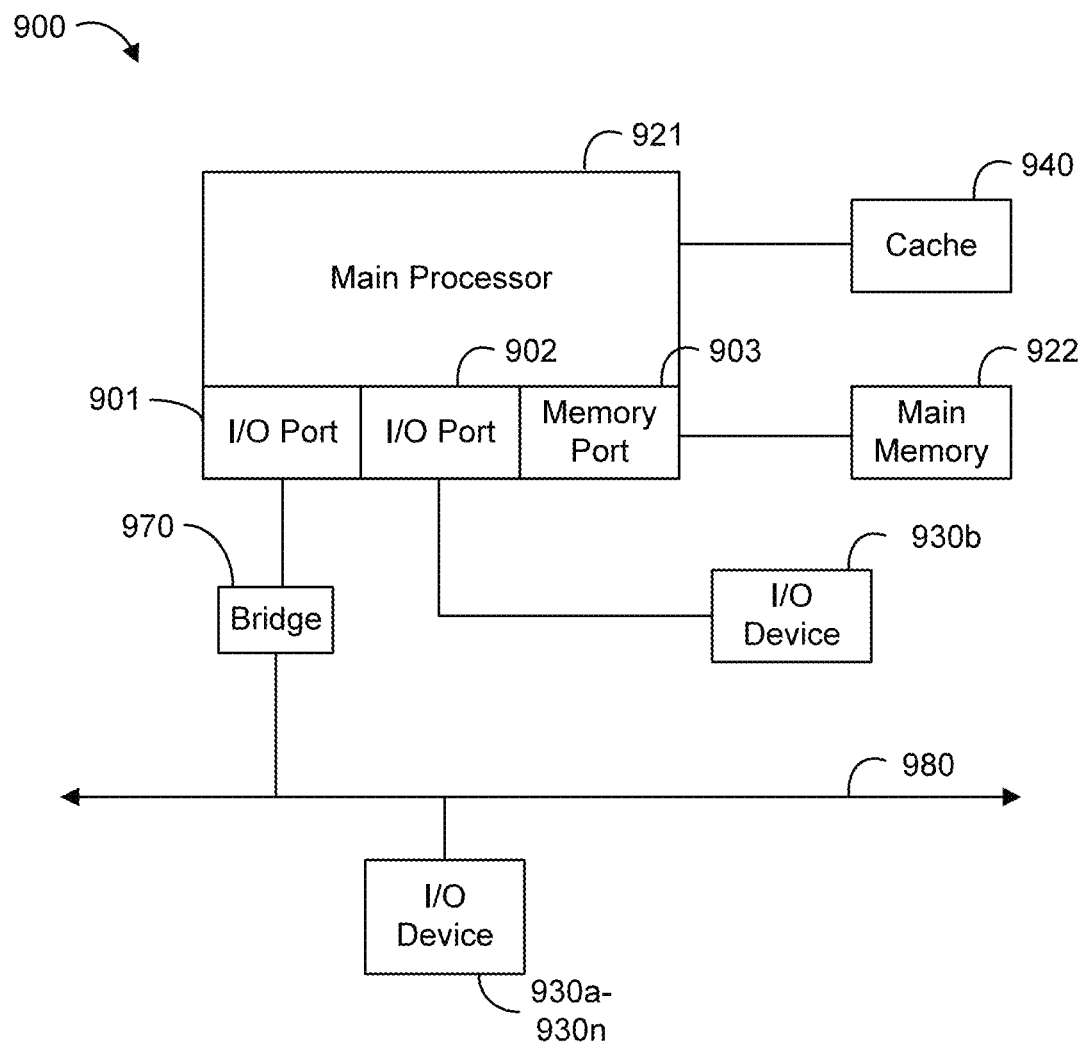

The systems discussed herein may be deployed as and/or executed on any type and form of computing device, such as a computer, network device or appliance capable of communicating on any type and form of network and performing the operations described herein. FIGS. 9A and 9B depict block diagrams of a computing device 900 useful for practicing an embodiment of the systems and methods described herein. As shown in FIGS. 9A and 9B, each computing device 900 includes a central processing unit 921, and a main memory unit 922. As shown in FIG. 9A, a computing device 900 may include a storage device 928, an installation device 916, a network interface 918, an I/O controller 923, display devices 924a-924n, a keyboard 926 and a pointing device 927, such as a mouse. The storage device 928 may include, without limitation, an operating system and/or software. As shown in FIG. 9B, each computing device 900 may also include additional optional elements, such as a memory port 903, a bridge 970, one or more input/output devices 930a-930n (generally referred to using reference numeral 930), and a cache memory 940 in communication with the central processing unit 921.

The central processing unit 921 is any logic circuitry that responds to and processes instructions fetched from the main memory unit 922. In many embodiments, the central processing unit 921 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 900 may be based on any of these processors, or any other processor capable of operating as described herein.

Main memory unit 922 may be one or more memory chips capable of storing data and allowing any storage location to be directly accessed by the microprocessor 921, such as any type or variant of Static random access memory (SRAM), Dynamic random access memory (DRAM), Ferroelectric RAM (FRAM), NAND Flash, NOR Flash and Solid State Drives (SSD). The main memory 922 may be based on any of the above described memory chips, or any other available memory chips capable of operating as described herein. In the embodiment shown in FIG. 9A, the processor 921 communicates with main memory 922 via a system bus 980 (described in more detail below). FIG. 9B depicts an embodiment of a computing device 900 in which the processor communicates directly with main memory 922 via a memory port 903. For example, in FIG. 9B the main memory 922 may be DRDRAM.

FIG. 9B depicts an embodiment in which the main processor 921 communicates directly with cache memory 940 via a secondary bus, sometimes referred to as a backside bus. In other embodiments, the main processor 921 communicates with cache memory 940 using the system bus 980. Cache memory 940 typically has a faster response time than main memory 922 and is provided by, for example, SRAM, BSRAM, or EDRAM. In the embodiment shown in FIG. 9B, the processor 921 communicates with various I/O devices 930 via a local system bus 980. Various buses may be used to connect the central processing unit 921 to any of the I/O devices 930, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 924, the processor 921 may use an Advanced Graphics Port (AGP) to communicate with the display 924. FIG. 9B depicts an embodiment of a computer 900 in which the main processor 921 may communicate directly with I/O device 930b, for example via HYPERTRANSPORT, RAPIDIO, or INFINIBAND communications technology. FIG. 9B also depicts an embodiment in which local busses and direct communication are mixed: the processor 921 communicates with I/O device 930a using a local interconnect bus while communicating with I/O device 930b directly.

A wide variety of I/O devices 930a-930n may be present in the computing device 900. Input devices include keyboards, mice, trackpads, trackballs, microphones, dials, touch pads, touch screens, and drawing tablets. Output devices include video displays, speakers, inkjet printers, laser printers, projectors and dye-sublimation printers. The I/O devices may be controlled by an I/O controller 923 as shown in FIG. 9A. The I/O controller may control one or more I/O devices such as a keyboard 926 and a pointing device 927, e.g., a mouse or optical pen. Furthermore, an I/O device may also provide storage and/or an installation device 916 for the computing device 900. In still other embodiments, the computing device 900 may provide USB connections (not shown) to receive handheld USB storage devices such as the USB Flash Drive line of devices manufactured by Twintech Industry, Inc., of Los Alamitos, California.

Referring again to FIG. 9A, the computing device 900 may support any suitable installation device 916, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 900 may further include a storage device, such as one or more hard disk drives or redundant arrays of independent disks, for storing an operating system and other related software, and for storing application software programs such as any program or software 920 for implementing (e.g., configured and/or designed for) the systems and methods described herein. Optionally, any of the installation devices 916 could also be used as the storage device. Additionally, the operating system and the software can be run from a bootable medium.

Furthermore, the computing device 900 may include a network interface 918 to interface to the network 203 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 900 communicates with other computing devices 900' via any type and/or form of gateway or tunneling protocol such as Secure Socket Layer (SSL) or Transport Layer Security (TLS). The network interface 918 may include a built-in network adapter, network interface card, PCMCIA network card, card bus network adapter, wireless network adapter, USB network adapter, modem or any other device suitable for interfacing the computing device 900 to any type of network capable of communication and performing the operations described herein.

In some implementations, the computing device 900 may include or be connected to one or more display devices 924a-924n. As such, any of the I/O devices 930a-930n and/or the I/O controller 923 may include any type and/or form of suitable hardware, software, or combination of hardware and software to support, enable or provide for the connection and use of the display device(s) 924a-924n by the computing device 900. For example, the computing device 900 may include any type and/or form of video adapter, video card, driver, and/or library to interface, communicate, connect or otherwise use the display device(s) 924a-924n. In one embodiment, a video adapter may include multiple connectors to interface to the display device(s) 924a-924n. In other embodiments, the computing device 900 may include multiple video adapters, with each video adapter connected to the display device(s) 924a-924n. In some implementations, any portion of the operating system of the computing device 900 may be configured for using multiple displays 924a-924n. One ordinarily skilled in the art will recognize and appreciate the various ways and embodiments that a computing device 900 may be configured to have one or more display devices 924a-924n.

In further embodiments, an I/O device 930 may be a bridge between the system bus 980 and an external communication bus, such as a USB bus, an Apple Desktop Bus, an RS-232 serial connection, a SCSI bus, a FireWire bus, a Fire Wire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 900 of the sort depicted in FIGS. 9A and 9B may operate under the control of an operating system, which control scheduling of tasks and access to system resources. The computing device 900 can be running any operating system, such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 900 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 900 has sufficient processor power and memory capacity to perform the operations described herein.

In some implementations, the computing device 900 may have different processors, operating systems, and input devices consistent with the device. For example, in one embodiment, the computing device 900 is a smart phone, mobile device, tablet or personal digital assistant. In still other embodiments, the computing device 900 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 900 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system comprising:
one or more processors coupled to memory and configured to:
store, in a data structure, for each message of a plurality of messages, an association between the message and a corresponding embedding generated using an embedding model of a plurality of models of a communications platform, the plurality of models comprising a threaded response generation model and the embedding model, wherein the threaded response generation model comprises a neural network;
obtain a first message to be processed by the communications platform;
determine that the first message is a thread-initiating message;
select, responsive to determining that the message is the thread-initiating message, from the plurality of models of the communications platform, the embedding model to generate, using the embedding model, a first embedding based on text included in the first message;
retrieve a second message as a response to the first message based on a similarity between the first embedding of the first message and a second embedding of the second message of the plurality of messages;
provide, to the communications platform, the second message;
obtain a third message to be processed by the communications platform;
determine that the third message is a message of a thread comprising multiple messages;
select, responsive to determining that the third message is a message of a thread comprising multiple messages, from the plurality of models of the communications platform, the threaded response generation model of the communications platform that is configured to receive as input the thread comprising the multiple messages and provide as output a response to the thread;
generate, by providing the thread as input into a layer of the neural network of the threaded response generation model, a fourth message as a response to the third message; and
provide, to the communications platform, the fourth message.

2. The system of claim 1, wherein the one or more processors are configured to generate the embedding by calculating one or more numerical vector representations of the text.

3. The system of claim 1, wherein the one or more processors are configured to train the threaded response generation model using a second plurality of messages by inserting each of the second plurality of messages into an initial encoding layer of the response generation model.

4. The system of claim 1, where the one or more processors are further configured to:
train the threaded response generation model to an accuracy above a threshold using a set of training data, wherein the one or more processors are configured to train the threaded response generation model using the second plurality of messages by inserting each of the second plurality of messages into an intermediary layer of the response generation model in response to the threaded response generation model being trained to an accuracy above the threshold.

5. The system of claim 4, wherein the threaded response generation model is the neural network.

6. The system of claim 5, wherein the one or more processors are configured to insert each of the second plurality of messages into the intermediary layer of the threaded response generation model by inserting each of the second plurality of messages into a final layer of an encoder of the neural network.

7. The system of claim 1, wherein the one or more processors are further configured to:
identify a second plurality of second messages from the thread of multiple messages by identifying a threshold number of messages from the thread.

8. The system of claim 7, wherein the one or more processors are further configured to identify the threshold number of messages from the thread by identifying the most recent threshold number of messages from the thread.

9. The system of claim 1, wherein the one or more processors are further configured to:
identify one or more words of a predetermined type from the first message or the third message; and
replace the identified one or more words with a token prior to determining whether the first message or the third message is a message of a thread comprising multiple messages.

10. The system of claim 1, wherein the one or more processors are configured to generate the embedding by inserting the text included in the first message into a machine learning model and executing the machine learning model.

11. A method comprising:
storing, by a processor in a data structure, for each message of a plurality of messages, an association between the message and a corresponding embedding generated using an embedding model of a plurality of models of a communications platform, the plurality of models comprising a threaded response generation model and the embedding model, wherein the threaded response generation model comprises a neural network;
obtaining, by the processor a first message to be processed by the communications platform;
determining, by the processor, that the first message is a thread-initiating message;
select, responsive to determining that the message is the thread-initiating message, from the plurality of models of the communications platform, the embedding model to generate, using the embedding model, a first embedding based on text included in the first message;
retrieving, by the processor, a second message as a response to the first messaged based on a similarity between the first embedding of the first message and a second embedding of the second message of the plurality of messages;
providing, by the processor to the communications platform, the second message;
obtaining, by the processor, a third message to be processed by the communications platform;
determining, by the processor, that the second message is a message of a thread comprising multiple messages; and
responsive to determining that the third message is a message of a thread comprising multiple messages, from the plurality of models of the communications platform, the threaded response generation model of the communications platform that is configured to receive as input the thread comprising the multiple messages and provide as output a response to the thread;

generating, by the processor by providing the thread as input into a layer of the neural network of the threaded response generation model, a fourth message as a response to the third message; and providing, by the processor to the communications platform, the fourth message.

12. The method of claim 11, comprising generating, by the processor, the embedding by calculating one or more numerical vector representations of the text.

13. The method of claim 11, comprising training the threaded response generation model using a second plurality of messages by inserting, by the processor, each of the second plurality of messages into an intermediary layer of the threaded response generation model.

14. The method of claim 11, further comprising:

training, by the processor, the threaded response generation model to an accuracy above a threshold using a set of training data, wherein training the response generation model comprises using a second plurality of messages by inserting, by the processor, each of the second plurality of messages into an intermediary layer of the threaded response generation model in response to the threaded response generation model being trained to an accuracy above the threshold.

15. The method of claim 14, wherein the threaded response generation model is the neural network.

16. The method of claim 15, wherein inserting each of the second plurality of messages into the intermediary layer of the layer of the threaded response generation model comprises inserting, by the processor, each of the second plurality of messages into a final layer of an encoder of the neural network.

17. The method of claim 11, further comprising:

identifying, by the processor, a plurality of second messages from the thread of multiple messages by identifying a threshold number of messages from the thread.

18. The method of claim 17, wherein identifying the threshold number of messages from the thread comprises identifying, by the processor, the most recent threshold number of messages from the thread.

19. The method of claim 11, further comprising:

identifying, by the processor, one or more words of a predetermined type from the first message or the third message; and replacing, by the processor, the identified one or more words with a token prior to determining whether the first message or the third message is a message of a thread comprising multiple messages.

20. The method of claim 11, wherein generating the embedding comprises inserting, by the processor, the text included in the first message into a machine learning model and executing the machine learning model.

* * * * *